United States Patent
Menon et al.

(10) Patent No.: US 11,533,366 B2
(45) Date of Patent: Dec. 20, 2022

(54) METHOD AND SYSTEM FOR CONTROLLING THE USE OF DORMANT CAPACITY FOR DISTRIBUTING DATA

(71) Applicant: Siden, Inc., New York, NY (US)

(72) Inventors: Narayan Parappil Menon, Syosset, NY (US); Rajendra Singh, Indian Creek Village, FL (US); Boris Bogatin, Philadelphia, PA (US)

(73) Assignee: Siden, Inc., New York, NY (US)

( * ) Notice: Subject to any disclaimer, the term of this patent is extended or adjusted under 35 U.S.C. 154(b) by 0 days.

(21) Appl. No.: 17/489,912

(22) Filed: Sep. 30, 2021

(65) Prior Publication Data

US 2022/0109724 A1    Apr. 7, 2022

Related U.S. Application Data

(60) Provisional application No. 63/087,267, filed on Oct. 4, 2020.

(51) Int. Cl.
*G06F 15/16*     (2006.01)
*H04L 67/1097*   (2022.01)

(52) U.S. Cl.
CPC ................. *H04L 67/1097* (2013.01)

(58) Field of Classification Search
CPC ............ H04L 67/1097; H04N 21/222
(Continued)

(56) References Cited

U.S. PATENT DOCUMENTS

| 5,652,759 A | 7/1997 | Stringfellow, Jr. |
| 9,456,247 B1 | 9/2016 | Pontual et al. |

(Continued)

FOREIGN PATENT DOCUMENTS

| CN | 1984118 A | 6/2007 |
| CN | 105391516 A | 3/2016 |

(Continued)

OTHER PUBLICATIONS

Pixeom website; https://pixeom.com/; 10 pages.
(Continued)

*Primary Examiner* — Liang Che A Wang
(74) *Attorney, Agent, or Firm* — Harness, Dickey & Pierce, P.L.C.

(57) ABSTRACT

A method and system for storing content includes determining candidate locations for pre-positioning a content at a content distribution system within a network. The method further includes communicating probe signals to the candidate locations, generating acknowledgement signals at candidate locations comprising storage availability data and compute data, selecting a real-time communication of the content or a pre-positioning communication of the content to form a selected communication based on dormant network capacity and at least one of a likelihood of consumption, the likelihood of consumption relative to a cost of storage, a cost of compute, and comparison of a cost of serving the content in real-time and a cost of serving the content using pre-positioning, selecting a selected content storage location for the content based on the storage availability data and compute data from the acknowledgment signals. The content is communicated to and stored at the selected content storage location.

28 Claims, 12 Drawing Sheets

(58) Field of Classification Search
USPC .................................. 709/217, 223, 226
See application file for complete search history.

(56) References Cited

U.S. PATENT DOCUMENTS

| | | |
|---|---|---|
| 10,433,022 B2 | 10/2019 | Norin et al. |
| 2004/0064325 A1 | 4/2004 | Syed et al. |
| 2007/0002871 A1 | 1/2007 | Pekonen et al. |
| 2007/0094023 A1 | 4/2007 | Gallino et al. |
| 2008/0244657 A1 | 10/2008 | Arsenault et al. |
| 2008/0273591 A1 | 11/2008 | Brooks et al. |
| 2010/0023972 A1 | 1/2010 | Summers et al. |
| 2010/0179987 A1* | 7/2010 | Sebastian ............ H04L 65/60 709/224 |
| 2011/0059706 A1 | 3/2011 | Harel et al. |
| 2014/0286165 A1* | 9/2014 | Chowdhury ......... H04W 4/029 370/235 |
| 2014/0334318 A1 | 11/2014 | Pica et al. |
| 2016/0028448 A1 | 1/2016 | Park et al. |
| 2016/0360255 A1 | 12/2016 | Pontual et al. |
| 2017/0331914 A1* | 11/2017 | Loach ............. H04N 21/25841 |
| 2018/0138958 A1 | 5/2018 | Asplund et al. |
| 2018/0139508 A1* | 5/2018 | Norin ............... H04N 21/6131 |
| 2019/0223029 A1 | 7/2019 | Clarke et al. |
| 2019/0273801 A1* | 9/2019 | Luft .................. H04L 67/566 |
| 2020/0037035 A1 | 1/2020 | Kaufman et al. |
| 2020/0195745 A1 | 6/2020 | Demsey |
| 2020/0243985 A1 | 7/2020 | Petersson et al. |
| 2020/0296155 A1* | 9/2020 | McGrath ............. G06F 9/5027 |
| 2020/0328804 A1 | 10/2020 | Xu et al. |
| 2020/0358646 A1 | 11/2020 | Lincoln et al. |
| 2020/0374713 A1 | 11/2020 | Bogatin et al. |
| 2021/0067814 A1 | 3/2021 | Bogatin et al. |
| 2021/0098873 A1 | 4/2021 | Veysoglu et al. |
| 2021/0099749 A1 | 4/2021 | Bogatin et al. |
| 2021/0127167 A1 | 4/2021 | Kaufman et al. |

FOREIGN PATENT DOCUMENTS

| | | |
|---|---|---|
| EP | 1030465 A1 | 8/2000 |
| EP | 3456083 B1 | 3/2020 |
| JP | 2001-313599 A | 11/2001 |
| JP | 2002-152153 A | 5/2002 |
| JP | 2003-169363 A | 6/2003 |
| JP | 2010-027004 A | 2/2010 |
| JP | 2015-532033 A | 11/2015 |
| KR | 2011-0093993 A | 8/2011 |
| WO | WO-03058967 A1 | 7/2003 |
| WO | WO2011/139305 | 11/2011 |
| WO | WO-2013103828 A1 | 7/2013 |
| WO | WO-2018/001897 A1 | 1/2018 |

OTHER PUBLICATIONS

Datami website; http://www.datami.com/; 9 pages.
Partial International Search Report for corresponding PCT/US2017/061760, dated Mar. 20, 2018, 13 pages.
Requirement for Restriction Election regarding U.S. Appl. No. 15/811,958 dated Jun. 7, 2018.
Non-Final Office Action regarding U.S. Appl. No. 15/811,958 dated Oct. 10, 2018.
Notice of Allowance regarding U.S. Appl. No. 15/811,958 dated May 22, 2019.
Chinese Office Action dated Apr. 3, 2020 in corresponding Chinese Application No. 2017800705362.
Japanese Office Action dated Dec. 1, 2020 in corresponding Japanese Application No. 2019-547232.
International Search Report and Written Opinion dated Dec. 9, 2020 in corresponding PCT Application No. PCT/US2020/053313.
International Search Report dated Oct. 21, 2021 in corresponding PCT Application No. PCT/US2021/041116.
International Search Report and Written Opinion dated Jul. 17, 2020 in corresponding PCT/US2020/034247.
International Search Report dated Feb. 3, 2022 in corresponding PCT Application No. PCT/2021/055714.
International Search Report and Written Opinion dated Mar. 21, 2022 in corresponding PCT Application No. PCT/US2021/053154.
International Search Report and Written Opinion dated Apr. 21, 2022 in corresponding PCT Application No. PCT/US2022/013293.
International Search Report and Written Opinion dated Jun. 21, 2022, in corresponding International Application No. PCT/US2022/021306.
Yao Jingjing et al., "On Mobile Edge Caching", IEEE Communications Surveys & Tutorials, vol. 21, No. 3, Mar. 29, 2019, pp. 2525-2553.
International Search Report and Written Opinion dated Aug. 1, 2022 in corresponding PCT Application No. PCT/US2022/028725.
International Search Report and Written Opinion dated Aug. 19, 2022 in corresponding PCT Application No. PCT/US/2022/031517.
Symeon Chatzinotas, et al., Cellular-Broadcast Service Convergence through Caching for CoMP Cloud RANs, Arxiv. Org, Cornell University Library, 201 Olin Library Cornell University Ithaca, NY, Apr. 30, 2015, 6 pages.

* cited by examiner

METHOD AND SYSTEM FOR CONTROLLING THE USE OF DORMANT CAPACITY FOR DISTRIBUTING DATA

CROSS-REFERENCE TO RELATED APPLICATIONS

This application is a non-provisional of U.S. Application 63/087,267 filed on Oct. 4, 2020, the disclosure of which is incorporated by reference herein. This application incorporates by reference herein the entire disclosures of provisional U.S. Ser. No. 63/051,582, filed on Jul. 14, 2020, U.S. Ser. No. 63/050,699, filed on Jul. 10, 2020, U.S. Ser. No. 17/095,686, filed on Nov. 11, 2020, U.S. Ser. No. 16/588,763, filed Sep. 30, 2019, U.S. Pat. No. 10,433,022 and U.S. Ser. No. 17/353,989, filed Jun. 22, 2021.

TECHNICAL FIELD

The present disclosure relates generally to content distribution systems and, more specifically, to a method and system for strategically determining network resources for communicating data through a communication system.

BACKGROUND

The statements in this section merely provide background information related to the present disclosure and may not constitute prior art.

The provisioning of increasingly higher speed wireless data connectivity has been the focus of wireless carrier infrastructure growth for several decades, and has accelerated with the rapidly rising demand by consumers to stream video to each or any of their devices, irrespective of where they are. The increasing wireless performance, together with both users' desires to consume more bandwidth intensive video content over the Internet, at lower marginal cost per bit, and wireless providers desire to serve more of the users' demands including in the home and also to large screen devices (i.e. TVs, laptops), is placing a requirement on wireless networks to accommodate a markedly higher level of capacity for handling this exploding video data traffic demand over wireless networks.

Further, wireless networks are still approaching video distribution using traditional means, which can be improved upon. Today, video data traffic is carried over wireless networks at the same time, as when consumers desire to consume such video data traffic. Since consumers consume data traffic at times driven largely by social structures, with significant consumption happening at the same time across the consumer base including during "prime time" hours, time intervals of significant "peak" consumption are typical and wireless networks often have insufficient capacity to handle such peak loads. Further, consumers mostly consume different content than other consumers at any given point of time, precluding efficient use of broadcasting content to users for real-time consumption (since has low relevancy) outside of select live content (i.e., sports events, time-scheduled releases of popular shows). However, consumers consume largely the same long-form content (i.e., blockbuster movies and hit TV series) as other consumers, over a longer period of time, so it is possible to "predict" what a consumer would consume with higher accuracy if the real-time requirement is relaxed to "over 3 months" or some other such longer than real-time timeframe. A system that would identify the content generally desired by consumers, that would broadcast such content over the networks in advance of the time it is desired to be consumed by consumers and during such times when the wireless networks had "spare capacity" not needed for real-time traffic needs, that would store such content locally at the consumers' premises, and serve such content to consumers over an unconstrained medium (i.e. home WiFi network), would be able to relieve wireless networks from significant amount of video data content and corresponding congestion.

Such a scheme provides major benefits to the end user as well as the service provider. This gives the end user access to cached content and data that the user can consume without using up primetime network bandwidth. This is even more valuable in scenarios where users' data usage is capped, and otherwise receiving content real-time, using primetime network bandwidth, can result in high cost to users; or in regions where broadband bandwidth is insufficient to provide content delivery to large numbers of users.

Dormant capacity management and content pre-positioning enables the service provider to deliver services to users, using dormant network capacity, without passing on a high cost to users. This is possible since the service provider is not leveraging primetime network resources (e.g. precious radio resources in a wireless network) to deliver the service. Large-scale content and data delivery to users is possible at a nominal cost.

At the same time, the provider is able to utilize their idle capacity completely (something they have paid for and is "sunk cost"), and keep network resources occupied throughout the day.

Last, but not least, later local consumption (over a local network such as home Wi-Fi or Ethernet) delivers significantly improved quality of service to the end user. Since the device does not need to livestream from deep within the network, quality of service metrics such as latency, jitter and throughput are vastly improved.

SUMMARY

The present disclosure provides a method for delivering data to user devices through an intermediate storage device that is pre-populated with data using various resources in a network by identifying the dormant capacity and not interfering with the network capacity through the network.

In one aspect of the disclosure, a method includes A method and system for storing content includes determining candidate locations for pre-positioning a content at a content distribution system within a network, which comprises overall capacity comprising regular capacity and excess capacity. The method further includes communicating probe signals to the plurality of candidate locations, generating acknowledgement signals at the plurality of candidate locations comprising storage availability data and compute data, selecting a real-time communication of the content or a pre-positioning communication of the content to form a selected communication based on dormant network capacity and at least one of a likelihood of consumption, the likelihood of consumption relative to a cost of storage, a cost of compute, and comparison of a cost of serving the content in real-time and a cost of serving the content using pre-positioning, selecting a selected content storage location for the content based on the storage availability data and compute data from the acknowledgment signals, communicating the content from the content distribution system to the selected content storage location using the excess capacity and storing the content at the selected content storage location.

In another aspect of the disclosure, a system includes a plurality of candidate locations for pre-positioning a content, a content distribution system programmed to communicate probe signals to the plurality of candidate locations and the plurality of candidate locations programmed to generate acknowledgement signals comprising storage availability data and a first compute data. The content distribution system is programmed to select a real-time communication of the content or a pre-positioning communication of the content to form a selected communication based on dormant network capacity and at least one of a likelihood of consumption, the likelihood of consumption relative to a cost of storage, a cost of compute and comparison of a cost of serving the content in real-time and a cost of serving the content using pre-positioning. The content distribution system is programmed to select a selected content storage location for the content based on the storage availability data and programmed to communicate the content from the content distribution system to the selected content storage location. The selected content storage location stores the content.

In yet another aspect of the disclosure, a method comprises generating a request for a first content at an end user device, communicating the request for the first content to a content distribution system, communicating a resource query signal from the content distribution system to a plurality of resource locations and communicating a resource acknowledgement signal from each resource location of the plurality of resource locations having the first content stored therein to form a plurality of resource acknowledgement signals. Each of the plurality of resource acknowledgement signals comprise content availability data and a compute availability data. The method further comprises comparing content availability data and the compute availability data from the plurality of resource locations, determining a delivery resource location from the plurality of resource locations based on comparing, generating a redirect signal comprising an identifier for the delivery resource location, communicating the redirect signal from the content distribution system to the end user device and requesting, by the end user device, the content from the delivery resource location based on the identifier.

In yet another aspect of the disclosure, a system comprises an end user device generating a request for a first content and communicating the request for the first content to a content distribution system. The system further comprises the content distribution system communicating a resource query signal to a plurality of resource locations. Each resource location communicates a resource acknowledgement signal of the plurality of resource locations having the first content stored therein to form a plurality of resource acknowledgement signals, each of the plurality of resource acknowledgement signals comprise content availability data and a compute availability data. The content distribution system is programmed to compare content availability data and the compute availability data from the plurality of resource locations, determine a delivery resource location from the plurality of resource locations based on comparing, generate a redirect signal comprising an identifier for the delivery resource location and communicate the redirect signal to the end user device. The end user device requests the content from the delivery resource location based on the identifier.

In another aspect of the disclosure, a method comprises determining content to be communicated to a plurality of storage devices within a communication system, determining a user demand pattern for the content, determining dormant storage capacity of the plurality of storage devices, determining storage device costs for storing the content at different storage devices of the plurality of storage devices, determining a selected storage device based on the user demand pattern, the dormant storage capacity and the storage device costs, determining dormant compute capacity of a plurality of computes within the communication system, determining compute costs for the content at a plurality of computes within the communication system, determining a selected compute based on the dormant compute capacity and the compute costs, determining dormant network capacity of a plurality of networks within the communication system, determining a selected network from the plurality of networks based on the user demand pattern, the dormant network capacity and communicating the content to the selected storage device using the selected network and the selected compute.

In still another aspect of the disclosure, a method comprises determining a plurality of candidate locations for pre-positioning a content at a content distribution system, communicating a first probe signal to a first candidate location of the plurality of candidate locations, generating a first acknowledgement signal at the first candidate location comprising a first storage availability data and first compute data, communicating a second probe signal to a second candidate location of the plurality of candidate locations, generating a second acknowledgement signal at the second candidate location comprising a second storage availability data and second compute data, selecting a selected content storage location from the plurality of candidate locations for the content based on the first storage availability data and the second storage availability data, determining excess capacity for distributing the content to the selected content storage location, selecting a real-time communication of the content or a pre-positioning communication of the content to form a selected communication based on a likelihood of consumption, a likelihood of consumption relative to a cost of storage, a cost of compute, an excess capacity and comparison of a cost of serving the content in real-time and a cost of serving the content using pre-positioning, communicating the content from the content distribution system to the selected content storage location using the excess capacity and the selected communication, storing the content at the selected content storage location, generating a user request from a user device and in response to the user request and after storing, communicating the content from the selected content storage location to the user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
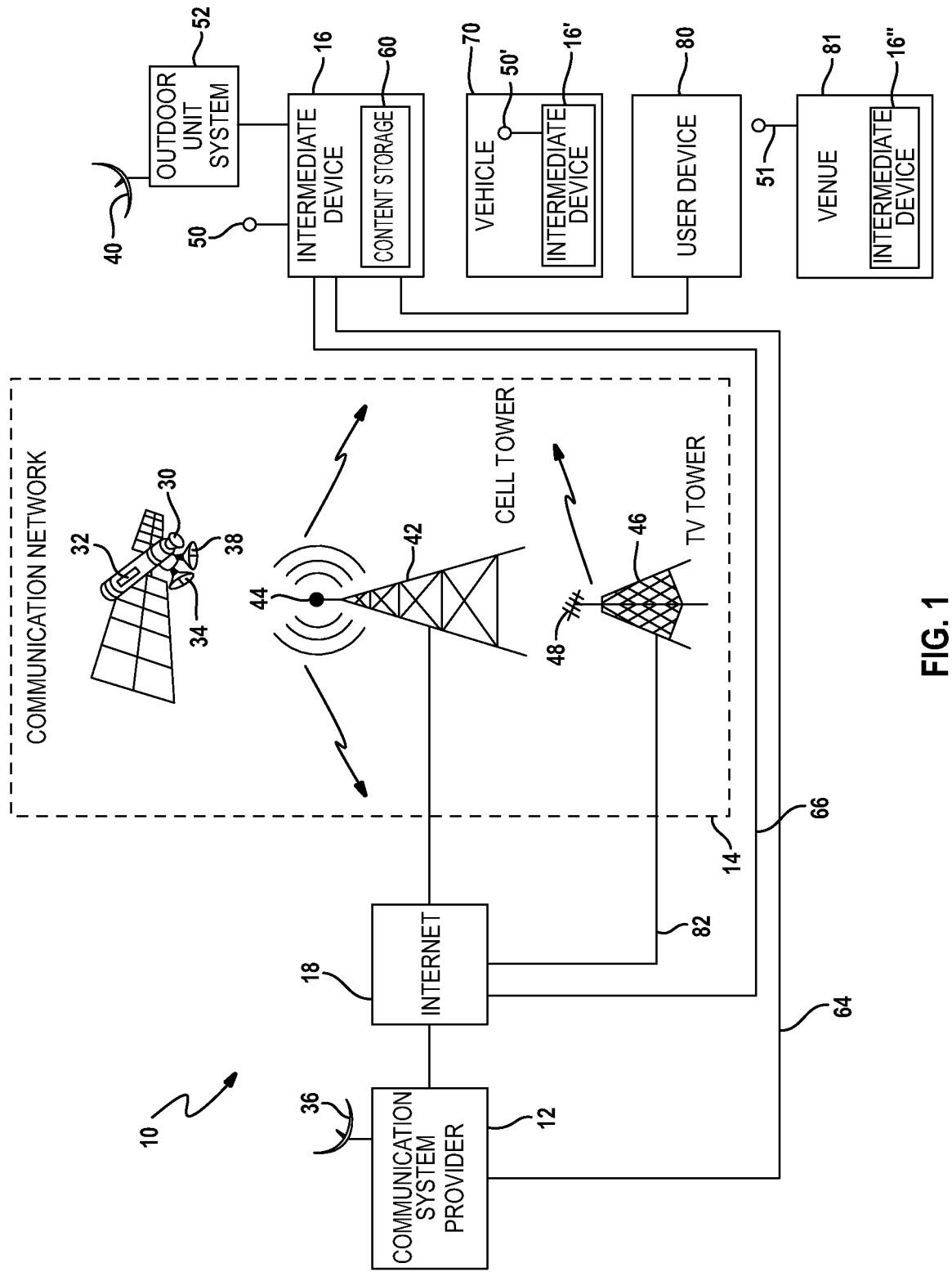
FIG. 1 is a high-level block diagrammatic view of a first example of a communication system.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure. The teachings of the present disclosure can be implemented in a system for electronically communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented electronically in analog circuitry, digital circuitry or combinations thereof. Further, the computing device may include a microprocessor or microcontroller that is programmed to perform instructions to carry out the steps performed by the various system components. A content or service provider is also described. A content or service provider is a provider of data to the end user. The service provider, for example, may provide data corresponding to the content such as metadata as well as the actual content in a data stream or signal. The content distribution system, service provider and end user devices may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media data and content type, for example, audio, music, data files, web pages, advertising, software, software updates, IoT data, weather, application, application data, "best of web" content, e-delivery of materials, etc. Additionally, throughout this disclosure reference is made to data, content, information, programs, movie trailers, movies, advertising, assets, video data, etc., however, it will be readily apparent to persons of ordinary skill in the art that the terms are substantially equivalent in reference to the example systems and/or methods disclosed herein.

While the following disclosure is made with specific broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, or mobile distribution systems, power-line broadcast systems, any point-to-point and/or multicast Internet Protocol (IP) delivery network, and fiber optic networks. Further, the different functions collectively allocated among a service provider and intermediate devices as described below can be reallocated as desired without departing from the intended scope of the present disclosure.

User devices may be coupled to the Internet through a constrained network or not even coupled to the Internet at all. In a constrained network, the speed or available resources may not be sufficient to provide a quality level of service. In the present examples, dormant capacity of the constrained network or a second less constrained network may be used to pre-position content at an intermediate device. The pre-positioned content may then be provided from intermediate device storage directly or through a second communication network (i.e. local network) when demanded at the user device for real time consumption, without having to rely on using the constrained network for that real-time consumption.

Dormant capacity is a resource or a plurality of resources that are not being used for transmitting data or content by a content system provider during regular customer use. Regular use of a communication network for primary customers may be referred to as a primary use. Dormant capacity may be referred to as a secondary use and may be governed between agreements between a content provider and a communication system provider. The content provider may wish to provide a service to users using the dormant capacity. Users may not be aware of the path the content traverses. The use of resources for the dormant capacity has a lower priority that can be allocated to another for a higher priority use. In the simplest sense, dormant capacity is a data path or bandwidth that is increasingly left unutilized during non-peak times of network use. Inversely, there is limited dormant capacity available during the peak times of network use. In all cases, such peak time of network use is characterized as the time when most of the usage of the services offered by the network is taking place by the network's users or direct customers. The non-peak time is the time when the least usage of the services is taking place by their users. For example, in a long-term evolution wireless network (LTE) system, dormant capacity may be the bandwidth not being used for voice or data content requested from users in real time. In the cases of "spectrum re-use," capacity used by some users for real-time consumption of some content during peak times, may leave dormant capacity at the same time as capacity that is either unusable by other users for real-time consumption of other content or only usable by other users for real-time consumption of the same content, if that content is broadcasted instead of unicasted. In the case of "network re-use," capacity used by some users for real-time consumption of content may leave dormant capacity that is not demanded by other users. In a satellite system, the dormant capacity is the bandwidth not being used for broadcasting of content to users for the sake of real-time consumption of such content or for voice or data content requested from users in real time and may similarly be under-utilized as in wireless network systems. There is a very limited incremental cost for utilizing this dormant capacity, or the unused or under-used resources of a communication provider's network, as that cost is already being borne for the provision of regular customer use services, and as such offers means for highly cost effective content distribution. By utilizing the dormant capacity that would otherwise be wasted, the present system allows communication system providers to use it to offer other services to customers or to sell the capacity to others.

The dormant capacity may be used in various ways by intercommunication of the intermediate devices, the communication system provider, and the content service provider. In the cases of "spectrum re-use", there have been many efforts to generate additional parallel uses of the same spectrum for real-time consumption by multiple users, using the same spectrum. However, utilizing dormant capacity, an almost infinitely high (as far as the number of users benefitting) amount of re-use can be generated by simply broadcasting this content, instead of unicasting it, and by having some users use it for real-time consumption, and for the dormant capacity to be used for non-real-time consumption by storing this same content at other intermediate storage devices at this same time, and then accessed by other users during a different time in the future, directly or using other communication networks, which may also be less constrained than the network described herein. Further, in the cases of "network re-use", today this dormant capacity goes largely unutilized as operators have had a challenging time of incentivizing "changes in user behavior" to use the network more during "off-peak" times than they otherwise would like for real-time consumption—the benefit to consumers of using the network during peak times for real-time consumption instead of during off-peak times, far outweigh any incentives or benefits which the operators can pass on to the consumers to shift their real-time consumption. However, such dormant capacity can be used in-full for non-real-time consumption, by unicasting or broadcasting content using dormant capacity and by storing this content at other intermediate storage devices, and then accessed by other users during a different time in the future, directly or using other communication networks, which may be less constrained than the network described herein.

Queries as to the current availability of capacity and the upcoming availability of capacity, including real-time consumptions and the remaining capacity, may be formed in order to identify the availability of dormant capacity. Further, Quality of service (QoS) prioritization using evolved multimedia broadcast and multicast services (eMBMS) quality class identifiers, as well as quality-of-service class identifiers (QCIs) used in any wireless or other communication system, may be performed, providing higher QCI levels to traffic for real-time consumption, while leaving traffic for non-real-time consumption on lower QCI levels, effectively rendering it to use of dormant capacity only.

Prioritization of content to be communicated using the dormant capacity may be formed. Delivery of content using dormant capacity may be queue-driven. All of the content to be delivered may be placed into the queue with attributed priority levels for each portion of content, and then served from the queue automatically upon dormant capacity availability, coordinating which content is served in which sequence per what rule. Content may also be retransmitted using dormant capacity. User preferences (queuing), missing content (error correction), content most popular for some users (personalization), content most popular for most users (popularity or short-tail optimization), as well as the remainder of content may all be used in prioritizing within queues.

The present system provides a high-capacity broadcast delivery system or a targeted unicast delivery system for pre-positioning content using a pre-position communication that combines the strategic use of excess capacity or dormant capacity in a content communication network with pre-positioning content close to the users by caching and storage of such content at local content stores, to allow users to access a large amount of content such as over-the-top (OTT) content, software updates, or other highly intensive data applications without needing to traverse the content communication network at the time the content is desired. This system may use the dormant capacity of a system over the same exact spectrum (in the case of spectrum re-use) as real-time consumption by broadcasting content to users including to those requesting it for real-time consumption and to others using the dormant spectrum capacity for pre-positioning, instead of just unicasting it to only the users requesting it for real-time consumption, or over dormant capacity left-over from non-peak-use of networks for real-time consumption, by unicasting or broadcasting content for pre-positioning. As will be further described below, the system may use dormant capacity of different types of communication systems including but not limited to mobile or cellular systems such as an LTE system, a satellite system or a digital television system. Content such as video content may be provided to an intermediate device, which stores the content therein. When users request content for real-time consumption, the content may be provided from the stored or cached content store, rather than requiring that content to be served by the content communication network in response to users' requests and subjecting users to slow speeds of the constrained content communication network or from further burdening the content communication network. A wide variety of video programming including movies, television, shows, documentaries and news may be provided based upon user preferences. Also, other types of video programming such as instant replays may also be provided to users. The system may also be used to provide software and application updates for various types of users that are coupled to the intermediate device. The system may also be used for defense purposes or purposes in which high amounts of data are required, but whereas such data may be pre-positioned at the local content store by the content communication network and not be required to be delivered from the source of such data on a live or real-time basis.

The system is particularly suitable for rural customers, customers in markets with lower speed, lower capacity networks, or customers of companies that want to utilize their lower speed networks to offer an equivalent of high speed cable or fiber network offerings, to have access to large data, over-the-top services or other large data applications. Specifically, the system may also allow non-rural or other customers to use wireless, satellite, TV, or DSL or other wired networks to effectively meet their content demands, without the need for an additional high-speed cable or fiber network offering. Thus, large data content, including over-the-top content (OTT) video, software updates, and other large data, may be offloaded to be served by the present system while the lower speed content communication network serves users' real-time/live voice and data requests, that cannot be pre-positioned effectively, using peak or regular capacity, and thus the need for high-speed cable or fiber network offerings within the home may be eliminated so that expenses may be reduced. The system may also allow congestion on even high speed cable and fiber networks, or any of the aforementioned networks, to be alleviated by combining content delivery through pre-positioning using the dormant capacity and subsequent use from local content stores and by serving users' real-time/live voice and data requests, that cannot be pre-positioned effectively, using peak or regular capacity, in a unified system. Further, this system may also increase the effective capacity of broadband networks by using a much greater portion, or the entirety, of a content communication network's capacity, by using the combination of dormant capacity for pre-positioning of content and subsequent use from local content stores, and peak or regular capacity for serving users' real-time/live voice and data requests. If content that is likely to be consumed by the user is pre-positioned at the local content store, or the intermediate device, and then served from the intermediate device (high likelihood of consumption), the need to instead use the content communication network on a real-time/live request basis is reduced, especially in peak hours. Pre-positioning of large data, including over-the-top video and software updates, frees the capacity of mobile and fixed broadband networks for other real-time content requests, real-time two-way communications, or other live content consumption, especially during peak times. By combining a pre-positioning, dormant or excess capacity approach with a real-time voice and data request, peak or regular capacity approaches, lower speed broadband service providers may compete head-to-head with established cable or fiber providers while any of the aforementioned networks improve their performance by leveraging such a combination of approaches.

It is also desired for a system to be able to serve users requests from a first user for real-time consumption with a real-time communication, using broadcast transmissions, not only when there are other users desiring the same content for real-time consumption (like in the case of the mode described in eMBMS), but also when there are other users who may desire this content for non-real-time consumption, in order to store this same content as in the first user's request in intermediate storage and then to access this content for real-time consumption but in the future, at a later time. When a first user requests to access content, instead of serving that first user's request using a unicast transmission, the system can instead serve that first user's request using a broadcast transmission, allowing that first user and any other user, desiring to access that content for real-time consumption, to real-time consume that content; while at the same time, the dormant broadcast transmissions to be able to be received by devices of any and all other users addressable by the broadcast transmission for non-real-time consumption, to store such content in those devices and for such any and all other users to access such content directly from their devices for real-time consumption at some later time.

The system could further make determinations of when it is advantageous to serve a given first user's request using a unicast transmission, as unicast transmissions are today higher throughput and have higher spectral efficiencies than broadcast transmissions on the order of 50-1,000%, and when it is advantageous to instead serve such first user's request using a broadcast transmission, where even though a broadcast transmission may be 50-1,000% disadvantaged in throughput and spectral efficiency than a unicast transmission, there are more than 50-1,000% more users than the first user which would benefit from having this request be received and stored by their devices for non-real-time consumption, and accessed for real-time consumption at a future time. This could involve analysis of not just how many users may benefit, but the likelihood of how many users may benefit based on analysis of their usage preferences, the popularity of the content in the request, and the likelihood that the cost of serving those users using unicast transmissions at a future time will be greater than the cost of using a broadcast transmission vs a unicast transmission at the current time. Factors for selecting a real-time communication of the content or a pre-positioning communication of the content to form a selected communication include a likelihood of consumption, a likelihood of consumption relative to a cost of storage, a cost of compute, excess capacity and comparison of a cost of serving the content in real-time and a cost of serving the content using pre-positioning. Such factors may be determined relative to a particular type of customer, business considerations of the system operator such as agreements with network and content providers and limitations in aspects of the hardware and networks.

Further, such system could also include a mechanism for determining whether any given device should receive the dormant or excess capacity broadcast and store the data for non-real-time consumption, or if it should simply let it pass by. This determination could be based on its current available storage, the content already stored on that device for non-real-time consumption, and the content scheduled to be delivered to that device for non-real-time consumption, and the relative value of such opportunistic broadcast data and the cost of receiving the content and storing the content versus the value of the content already stored on that device or scheduled to be delivered to that device for non-real-time consumption.

For example, a first user desires to watch a movie #1, which is a relatively popular film, and requests it to be delivered for real-time consumption. The system analyzes that only 10% of the users in the same area as the first user, have movie #1 already stored on their devices for non-real-time consumption, but that of the remaining 90% of the users, 70% of those 90% or 63% would have a high likelihood of consuming movie #1 at a future time if it was stored on their devices for non-real-time consumption. The system serves movie #1 to the first user using a broadcast transmission instead of a unicast transmission, while having the other 63% of the users in the area as the first user receive the dormant broadcast transmission and store movie #1 for non-real-time consumption by the 63% of the users. In the future, some of the users whose devices stored movie #1 for non-real-time consumption, request to watch movie #1 at some future times, and movie #1 is served to them directly from their devices instead of using the network.

In the present example, optimized usage of a multiplicity of resource types (storage, computing, networking), based on cost, performance and demand requirements is set forth. Traditionally, systems have looked at these resource types individually and one-dimensionally. For example, radio resource management focuses on optimal usage of RF resources based on service requirements, contentions between competing requirements and user Service Level Agreements (SLAs). Another individual resource typically considered is the management of fixed network resources, e.g. Software Defined Network (SDN) style approaches. Storage and compute management and cloud-based architectures have been considered individually.

In the present example a cohesive, a combinatorial use of such a diverse set of resources to facilitate cost-effective, performance-optimized delivery of content, based on user needs and user demand patterns is provided.

While existing systems look to leverage in-network compute, storage and networking resources in a traditional cloud framework, this disclosure extends the concept to a "System as a Cloud" model—wherein resources (compute, storage and networking) can be interchangeably assigned and arbitraged across the entire system, including but not limited to the traditional cloud—processing and storage farms in the network core, wireless core network components and gateways, network edge nodes—such as base stations, access points/routers, small cells, cable edge boxes (e.g. CMTS), and the like, intermediate storage/caching devices, in the network or in the home or office, end user devices, e.g. smartphones, tablets, personal computers, and the like. This may include using the available storage of mobile devices as intermediate devices for non-real-time consumption, by applications of those mobile devices. This may also include using the available storage of the mobile devices for non-real-time consumption, by applications of other mobile devices completely separate from the first mobile devices. The present example determines, at any given time, the optimal combination of resources, across the entire system, to deliver content based on cost, performance and user demand considerations.

In the present system, the coordinated use of all system resources types such as networking, storage, computing are used in a cohesive fashion to deliver content and services in the most cost and performance efficient manner. The content distribution system uses resources (compute, storage, networking) anywhere in the system. The dormant or excess capacity of different aspects of the system may be used. The term dormant may be used interchangeably with term excess when referring to capacity. The dormant capacity extends to not only the communication network but various resources such as dormant storage capacity, dormant networking capacity and dormant compute capacity. The ability to pre-position (place in advance) content in different places in the system, using dormant capacity to prepare for subsequent consumption by the user, from local, or close-to-local, storage points minimizes network access cost at the time of consumption. Intelligence and continual decision-making in the distribution system are used to determine in real-time what content is to be pre-positioned for non real-time consumption, the best places or devices in the system for placement of content given costs of compute and storage resources available at different locations, the networking costs to do the pre-positioning at those locations, and the ability of these devices to fulfill the largest number of application requests for consumption, and the most valuable requests for consumption. The decision making process also decides the best network resources to use to pre-position the content in these locations, the best time to do the pre-positioning and the best resources to be used to deliver content when the user is ready to consume the content. The ability to arbitrage across storage, compute and network resources to enable the most cost and performance effective delivery scheme is provided in the present system.

The parameters that drive this multi-dimensional resource management approach are cost, performance and user demand patterns. The cost factor includes costs of all resources used in the chain: networking, storage and compute. A cost factor may be assigned to all network resources, compute resources and storage resources. Cost requirements can vary, depending on the type of user or service. A price-focused user, for example, would emphasize the lowest possible cost. A premium user, on the other hand, with a more upscale Service Level Agreement (SLA) might emphasize high performance. The premium type of user is likely willing to pay a higher price to demand access to higher bandwidths and throughputs, higher volumes of content and better quality of service, as in low latency, jitter etc. User demand patterns also play a role in the resource allocation. Factors like immediacy may be considered. That is, whether a piece of content is required for immediate consumption, or can be cached and viewed in a time-shifted fashion are potential considerations. Popularity may also be a factor in deciding how to allocated resources. Popularity is which titles and content pieces are most in demand in a given geographic area, may also be considered.

Referring now to FIG. 1, a high-level block diagrammatic view of a communication system 10 is set forth. In this example, a communication system provider 12 is a system that is in communication with a communication network 14 and controls the operation of the communication network 14. The communication network 14 is in communication with one or more intermediate devices such as an intermediate device 16. The communication system provider 12 is used for controlling the communication network 14. The communication network 14 may be in direct connection with the communication provider or to the internet 18. The communication system provider 12 controls the schedule and placement of content through the communication network 14. The communication system provider 12 may receive content from various sources as will be described further below.

The communication network 14 is in communication with the internet 18. The communication network 14 may be a single stand-alone network or may be a combination of networks. The communication network 14 is a wide-area network. The dormant capacity of one or more networks may deliver content to the intermediate device 16. The communication network 14 may be wireless. The communication network 14 for communicating content to the intermediate device 16 may include a satellite 30 that has one or more transponders 32 therein for receiving and communicating content therefrom. The satellite 30 may also include a receiving antenna 34 that is in communication with an antenna 36 of the communication system provider. A transmitting antenna 38 communicates content to an antenna 40 of the intermediate device 16. The antennas 34, 36, 38 may represent multiple antennas or multiples types of antennas.

The communication network 14 may also include a cell tower 42, or any other wireless transmission device, having an antenna 44 (or antennas) thereon. The antenna 44 may represent a cellular antenna, a Wi-Fi antenna, or any other wireless transmission antenna of the cell tower 42 and may communicate content wirelessly to the intermediate device 16 through the antenna 44, from the communication system provider 12, including also wirelessly through the antenna 44.

The communication network 14 may also include a television tower 46 having an antenna 48 thereon. The TV tower 46 may communicate content to the intermediate device 16 from the communication system provider 12. Any of the systems employed as the communication network 14 communicated over a wide geographic area and thus is referred to as a wide-area network. This is different than a local area network that make communicate content in a small geographic area over the last mile.

In all communication system cases, the communication network 14 may communicate using dormant capacity as will be further described below. The dormant capacity may include various types of resources, that are not being used for serving users' real-time/live voice and data requests and their real-time/live voice and data consumption, and that are more ideally used for pre-positioning of content to the intermediate device 16. As mentioned above, the communication network 14 may effectively distribute (pre-position) content on a non-real-time basis to the intermediate device 16, for subsequent consumption by users directly from the intermediate device 16 instead of from the communication network 14.

The communication network 14 may communicate with the local area network 310, which would in turn communicate the content to the intermediate device 16, or the intermediate device 16 directly, using various types of access systems so that a maximum amount of content may be provided to the various intermediate devices. For example, the communication network 14 may use frequency division multiple access, timed division multiple access, spatial division multiple access, code division multiple access and orthogonal frequency division multiple access. Depending upon the requirements of the system and the types of systems provided, different types of access protocols may be used.

The intermediate device 16 may also have an antenna 50 disposed thereon. The antenna 50 may communicate with the antenna 44 and the antenna 48 of the communication network 14. By making the intermediate device portable, the antenna 50 may be placed in a position of high reception. The intermediate device 16 may act as a small cell.

An antenna 40 of an outdoor unit system 52 may be used to communicate with the antenna 38 of the satellite 30. The antenna 40 may be a flat faced phased-array antenna. Details of the outdoor unit system 52 and the intermediate device 16 are provided below.

The intermediate device 16 may also include a content storage 60. The content storage 60 may include a solid-state content storage (memory), a hard disk drive or a combination of both. The content storage 60 may be designed to hold a substantive amount of data on the order of multiple terabytes or greater. The content storage 60 is used to store pre-positioned content received through either the antenna 40 or the antenna 50. The intermediate device 16 may also be in communication with a back haul network 64. The back haul network 64 may be part of the communication network, which, as demonstrated, is presented as wireless systems. The back haul network 64 may be a wireless network as well.

The system 10 may be suitable for pre-positioning content using a wired network 66 as well. That is, the intermediate device 16 may also be coupled to the Internet 18 through the wired network 66. Content may be pre-positioned using the dormant capacity of the wired network 66 as will be described below. The wired networks may be a DSL network, a cable network, or a fiber network.

The communication network 14 may also be in communication with a vehicle 70. The vehicle 70 may include an intermediate device 16' configured in the same manner as that of the intermediate device 16. The vehicle 70 may include various types of vehicles including an automobile, a ship, a bus, a train, an airplane or the like. The intermediate device 16' is coupled to one or more antennas 50' that may be located on the exterior of the vehicle. Of course, the antennas 50' may be located within the vehicle 70 at the intermediate device 16'. A user device 80 is in communication with the intermediate device 16. For convenience, a line representing either a wireless or wired connection is presented between the user device 80 and the intermediate device 16. The user device 80 requests content from the intermediate device 16 and, more particularly, from the content storage 60 of the intermediate device 16. A venue 81 such as a stadium, office building, hotel or multiple dwelling unit may have an intermediate device 16" with an exterior antenna 51 in communication with the satellite antenna 38, the antenna of the cell tower 42 and/or the antenna 48 of the TV tower.

The cell tower 42 may use LTE technology or other cellular technology. In particular, the cell tower 42 may use LTE-B technology to communicate with the intermediate device 16. A wired connection 82 may be disposed between the communication network 14 and the internet 18 and/or communication system provider 12. As will be described below, the intermediate device 16 may be part of the cell tower 42 and thus the antenna 44 may act as a Wi-Fi or WiMAX antenna for communicating with the user devices.

The connection between the communication network 14 and the internet 18 or the communication system provider 12 may also include dormant capacity. This dormant capacity may be utilized by the system in a similar way as the afore described dormant capacity, to distribute pre-positioned content to the communication network 14 or to the internet 18, for their in-turn distribution of the pre-positioned content, including using dormant capacity, to ultimately reach the intermediate device 16.

More than one of the systems and devices illustrated in FIG. 1 may be incorporated into a system. In fact, more than one system or device is likely whereby it encompasses a broad geographic area.

Figure 2:
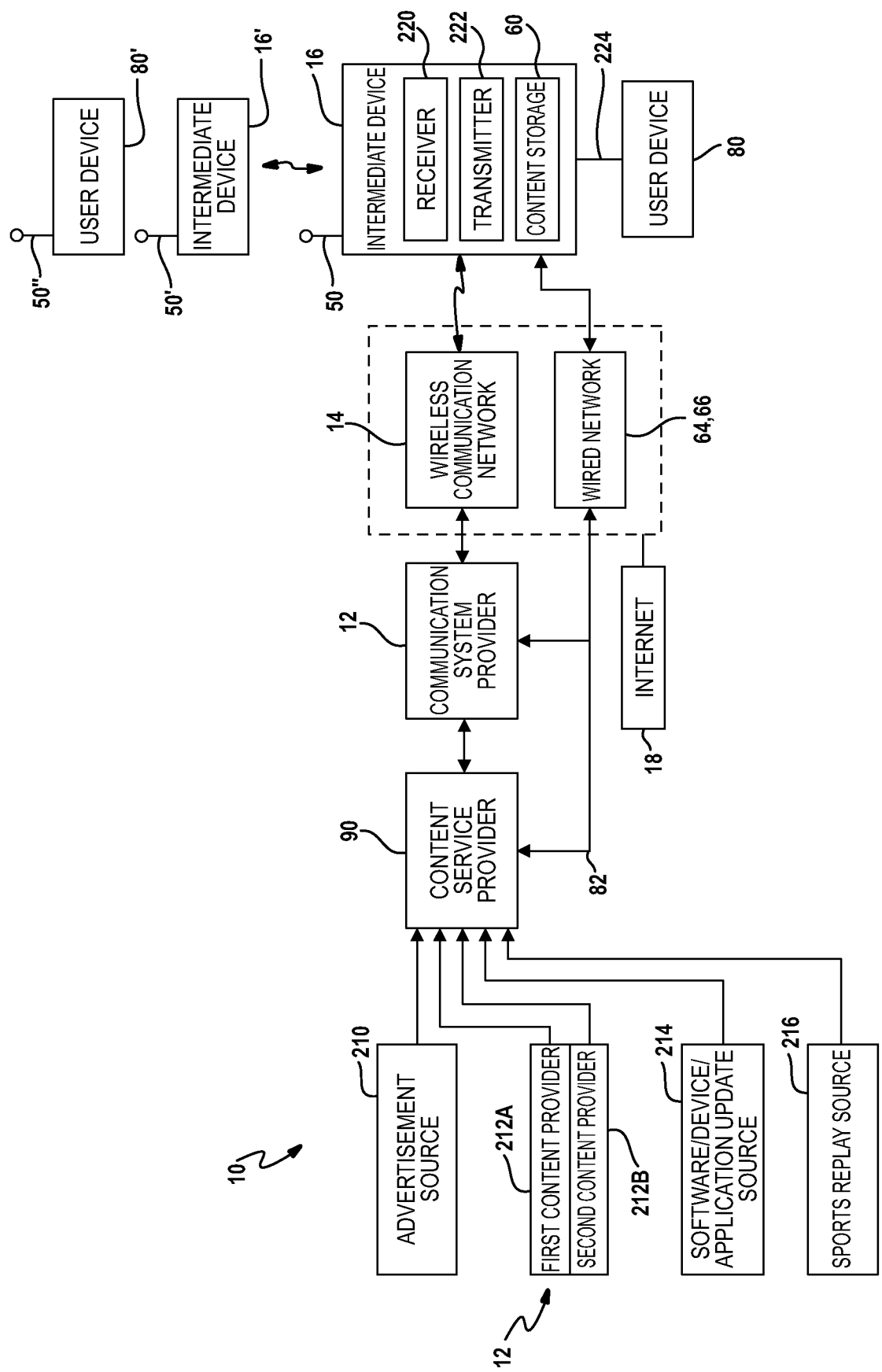
FIG. 2 is a block diagrammatic view of a more detailed communication system of FIG. 1.

Referring now to FIG. 2, the communication system provider 12 may be more than one entity. The communication system provider is shown in the first content provider 212A, the second content provider 212B communication with a content service provider 90. The content service provider 90 is a system that is used for providing content to the communication system provider 12. The content service provider 90 and the communication system provider 12 may be business entities. The content service provider 90 may purchase the dormant capacity of the communication system provider 12. The content service provider 90 may be a service provider that is subscribed to by the users of the user device 80. However, the content service provider 90 may include pre-existing services such as mobile phone service providers, cable providers, digital television providers and the like. The content service provider 90 communicates various instructions to the communication system provider 12 so that the content is distributed using the dormant capacity of the communication system provider 12. Details of the intercommunication between the systems are described in further detail below.

The content service provider 90 may receive content from various sources including an advertisement source 210, the first content provider 212A, the second content provider 212B, a software/device/application update source 214 and a sport replay source 216. The advertisement source 210 may communicate advertisements to the content service provider 90. The advertisements may include video, audio and metadata associated therewith. The metadata associated with an advertisement may include desired targets or which users would find the content desirable and a product definition.

The content providers 212A and 212B may also provide video and audio content as well as metadata for the content. The metadata may include the content title, actors or actresses, and various other identifying data including various categories such as genres and the like. The content may be requested from the content providers or indicated to be pre-positioned at the intermediate devices by the content providers.

The software/device/application update source 214 may provide new software, software updates, device updates and application updates to the intermediate device 16 through the content service provider 90 and the communication system provider 12, intended for the user device. The updates may be incremental changes to software resident in a user device, whereas the new software may be software not currently within the user device or intermediate device 16. The software and updates may be requested by a device for a non-real-time delivery or delivered through no action of the device and pre-positioned at the intermediate device based on the identity of the user device, the software or the applications residing thereon.

The sports replay source 216 may provide sports replays to the content service provider 90 for distribution to the intermediate device 16. The sports replay content may be short video clips of certain special or important events of a game or match. Sports replays may be clips that include both audio and video content. The sports replay may also include metadata that identifies the team, the players involved, the sport, the clip or replay display title and the like. The clip display title is what may be displayed to a user in a user interface.

The metadata included with the various types of content described above allows the content to be distributed to the proper intermediate device or intermediate devices on the right schedule while accommodating any other content distribution priorities while using the dormant capacity of the communication network under the control of the communication system provider 12.

The intermediate device 16 is illustrated having content storage 60 and also a receiver 220. The receiver 220 may be used to receive communications from the wireless communication network 14. A transmitter 222 may be used to transmit wirelessly or by wire to and from the wireless communication network 14, the wired network 64 and/or the wired network 66.

The user device 80 is illustrated having a direct or wired connection 224 with the intermediate device 16. The intermediate device 16 may thus be a dongle or other type of directly connected device to the user device 80. The wired connection 224 may be an HDMI or USB connection.

More than one intermediate device may be disposed in a system. The intermediate device 16 may also communicate with a second intermediate device 16'. The intermediate device 16' may be configured in the same manner as that of the intermediate device 16. The intermediate device 16 may communicate from the antenna 50 to the antenna 50' of the intermediate device 16'. The intermediate devices 16, 16' may form a peer-to-peer network, which is described in more detail below. Of course, more than two intermediate devices may form a peer-to-peer network. The peer-to-peer network may communicate various types of content therebetween. That is, if one intermediate device misses a portion of a content transmitted from the wireless communication network 14, another intermediate device may be queried to determine whether the intermediate device includes the missing content. The missing content may thus be communicated in a peer-to-peer basis between the antennas 50 and 50'. The wireless communication network 14 may also distribute various portions of the content that are then communicated to various other intermediate devices in an intentional way rather than a "missing" way. If content is desired by the user of one intermediate device but is not available at that intermediate device, the intermediate device for the intentional request may request the content from another intermediate device within the peer-to-peer network. Further, some such intermediate devices 16' may be configured to not have an ability to receive content from wireless communication network 14, and be only able to communicate with other intermediate devices 16 and 16' to receive such "intentional" or "missing" content.

The intermediate device 16' may be in communication with a user device 80'. The user device 80' may be in communication with the intermediate device 16' through the antenna 50". The user device 80' may be configured in a similar manner to that set forth at the user device 80' but may be a wireless device rather than a wired connection as is illustrated with respect to the user device 80.

Figure 3:
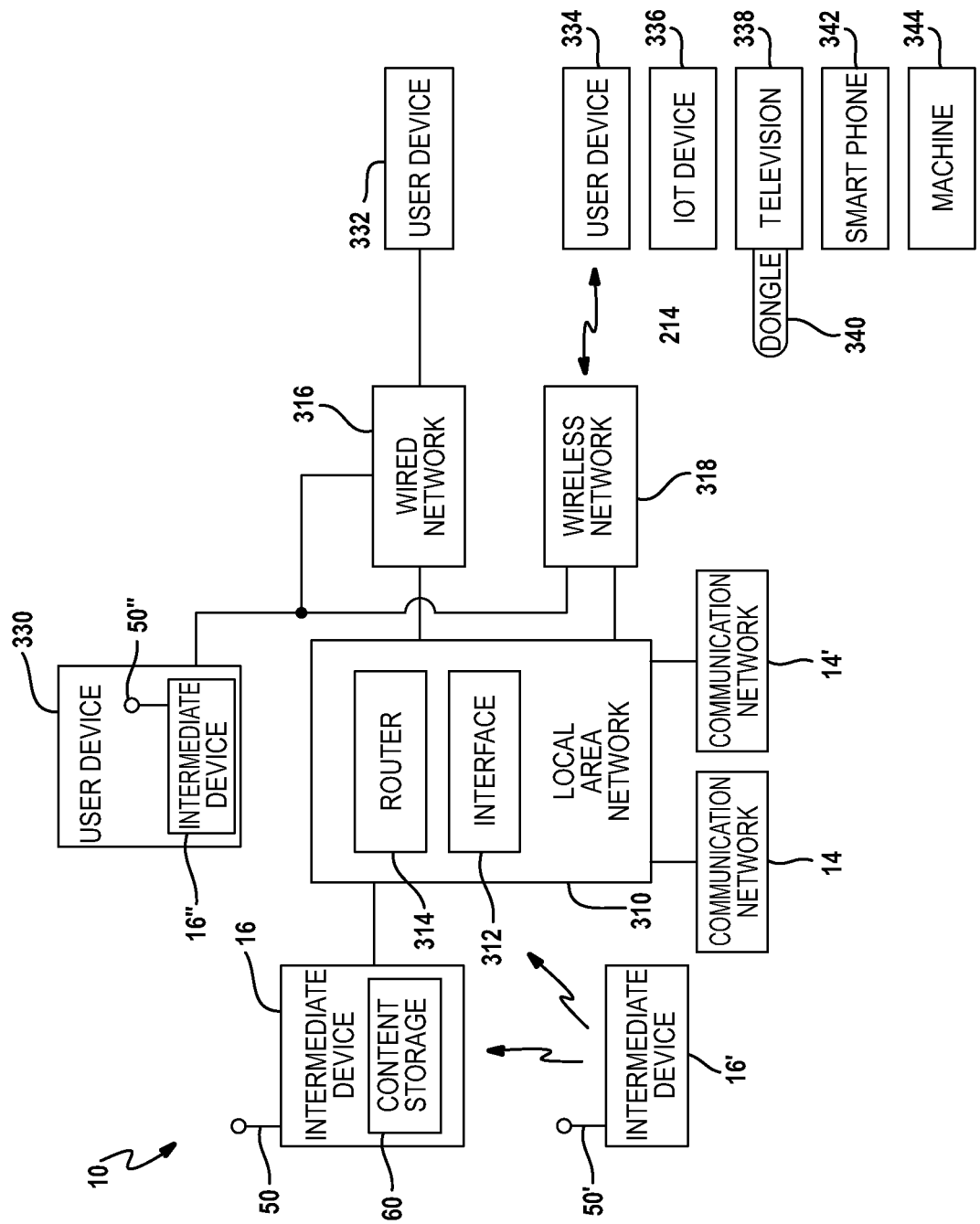
FIG. 3 is a block diagrammatic view of a plurality of user devices in a local area network.

Referring now to FIG. 3, the communication system provider 12 may be in communication with a local area network 310 through the communication network 14 as described above. Only the communication network 14 is illustrated for simplicity. FIGS. 1 and 2 do not illustrate the local area network 310. The local area network 310 may have an interface 312 for communicating with the communication network 14. The interface 312 may be a modem.

The local area network 310 may also be coupled to a second communication network 14'. The second network 14' may be the primary two-way connection to the Internet for the user devices 332-344. The second network 14' may represent dial-up or a digital subscriber line. As described in the examples set forth herein, the system 10 may be used to pre-position content in the intermediate device 16. The supplementation of content is particularly useful when the second communication network 14' for providing regular internet service to user devices 332-344 is slower than the speed of the communication network 14, although not necessarily. It is possible that the local area network 310 may not have a two-way connection to the internet except the pre-positioned content received through the communication system.

The local area network 310 may also include a router 314. The router 314 may be used for connecting the intermediate devices with user devices within the local area network 310. The local area network may provide both a wired network 316 and a wireless network 318. Various devices may take advantage of each method of communicating.

The local area network 310 is in communication with one or more intermediate devices 16 as described above. The local area network 310 may also include an intermediate device 16, along with an interface 312, and a router 314. The local area network 310 may also include a user device 332, along with an intermediate device 16, interface 312, and a router 314. The intermediate device 16 includes the content storage 60 and the antenna 50 as described in FIGS. 1 and 2. The intermediate device 16' is in communication with the local area network 310 and may exchange content or other signals with the intermediate device 16 through the local area network 310. An intermediate device 16" may also be located within a user device 330. The user device 330 or the intermediate device 16" therein may include an antenna 50" for communicating with the local area network 310. The intermediate device 16" may receive content using the dormant capacity of the communication network 14. The user device 330 may be one of a variety of types of devices including a video game console, a cellular phone, a set top box or the like.

The user device 330 may be coupled to the local area network 310 through either the wired network 316 or the wireless network 318.

A user device 332 may be coupled to the local area network 310 through a wired network 316. The user device 334 may be coupled to the local area network 310 through a wireless network 318. As mentioned above, the user devices 332, 334 may be various types of user devices including a cellular phone or smartphone, a tablet, a laptop, a TV or the like.

An internet of things (IoT) device 336 may be coupled to the local area network 310 through the wireless or wired networks 316, 318. The IoT devices 336 may require software and application updates suitably delivered via dormant capacity.

A television 338 may also be coupled to the local area network 310 through the wired network 316 or the wireless network 318. The television 338 may be a smart television for directly coupling to the wired network 316 or the wireless network 318. However, the television 338 may also require a dongle 340 that is used for communication with the wireless network 318. The dongle 340 may have an application therein for providing the television 338 with a graphical user interface. The dongle 340 may also include a content storage for storing content therein. The dongle 340 may also act as an intermediate device for receiving and storing content.

A smartphone 342 may also be in communication with the wired network 316 and the wireless network 318 so that access to the local area network 310 may be obtained.

A machine 344 may also be in communication with the local area network 310 through the wired network 316 or the wireless network 318.

All of the user devices 330-344 may be in communication with the wireless network 318 using many different types of standards including Bluetooth and Wi-Fi. Each of the user devices 330-344 may receive content through the local area network 310 from at least one of the intermediate devices 16, 16' and 16". The application for retrieving and serving content to the user devices 330-344 may be in the devices 330-344, in the intermediate device 16, in the local area network 310, in the router 314 or in the interface 312. The user devices may 330-344 may also have content storage incorporated therein. The integral storage may allow the user device to act as an intermediate device.

The types of content may include audio content, video content, operating system updates, other software updates, applications, weather information, "best of web" content and e-delivery of various materials. The users of the user devices 330-344 may each obtain the various types of content from the content storage 60 of the intermediate device 16. The content may be obtained individually or simultaneously from the content storage 60. As will be described below, the user devices 330-344 may provide an inventory list or a list of desired content that is communicated through the local area network 310 and ultimately back to the communication system provider 12 of content service provider 90 illustrated in FIGS. 1 and 2. The communication back may be performed with either the communication network 14 or 14'.

Figure 4:
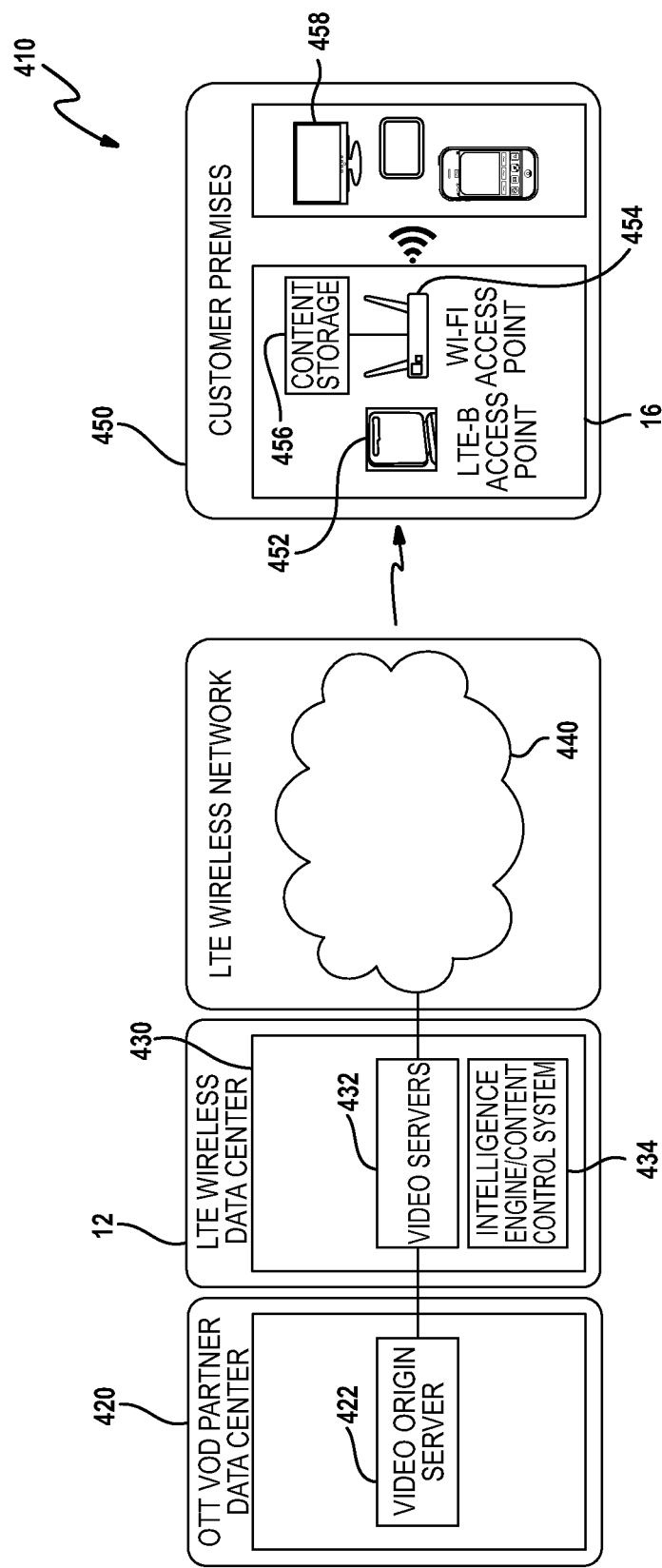
FIG. 4 is a high-level block diagrammatic view of a communication system using an LTE wireless network.

Referring now to FIG. 4, an LTE content delivery system 410 is illustrated. In this example, the communication modules are specifically directed to an LTE system that provides an over-the-top video system. However, other cellular phone systems may be used. An over-the-top video on-demand partner data center 420 acts as the content service provider 90 and has a video origin server 422 disposed therein. The video origin server 422 receives video content from various sources including the sources set forth in FIG. 2. The partner data center 420 is in communication with the communication system provider 12. In this case, the communication system provider 12 is an LTE wireless data center 430. The LTE wireless data center 430 includes video servers 432 that are in communication with the video origin server 422. The wireless data center 430 is also in communication with an intelligence engine/content control system 434. The intelligence engine/content control system 434 may be used for various functions as will be described in detail below. The intelligence engine/content control system 434 may, in general, be used for identifying dormant capacity, including that of LTE wireless network 440, and scheduling the delivery of content to the intermediate devices, including using LTE wireless network 440. The intelligence engine/content control system 434 may also be responsible for managing the content at the intermediate devices by removing the content when necessary. The intelligence engine/content control system 434 may also be responsible for calculating the optimal amount of content, the frequency of such content re-distribution, and the relative timing of different content to be distributed by the LTE wireless network 440 and to be distributed to any intermediate device 16.

The video servers 432 of the wireless data center 430 is in communication with an LTE wireless network 440. The LTE wireless network 440 is in communication with a customer premises 450. The customer premises 450 may include an intermediate device 16. The intermediate device 16 may include an LTE-B access point 452 used for accessing the content at the wireless network 440. The access point 452 may also be used for receiving instructions for tuning to the wireless network 440. Specific instruction signals may be provided for tuning to content at specific times. Channels, frequencies and times may all be communicated in the instruction signals.

The intermediate device 16 may also include a Wi-Fi access point 454 and a content storage 456. The Wi-Fi access point 454 may establish a Wi-Fi network with the various user devices 458 within the system. The Wi-Fi access point may be referred to as a router. The content storage 456 may be used to store the content received through the LTE-B access point 452. Of course, other wireless technologies may be accessed by the wireless access point. Each of the user devices 458 may include an application for accessing the content within the content storage 456. The application may also be received through the access point 452 or it may be pre-stored within the content storage 456 when a user purchases the system. The application may also be pre-stored within the user devices 458.

Figure 5:
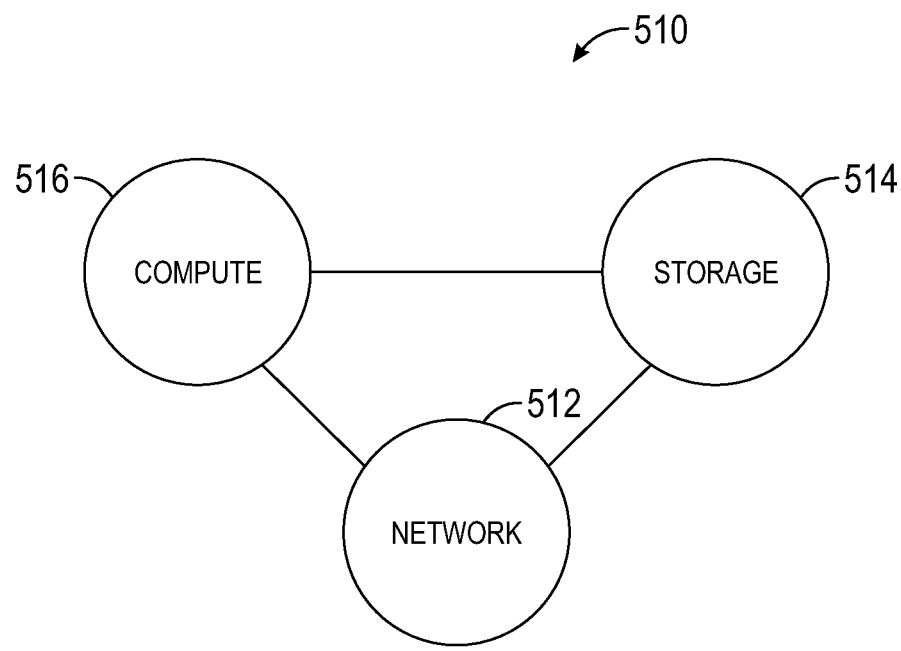
FIG. 5 is a block diagrammatic view of the difference types of resources available within a communication system.

Referring now to FIG. 5, the types of resources 510 in a system may be considered three distinct resources. The resource types that can be optimized to deliver the right results. The types of resources 510 include are the network resources 512, the storage resources 514 and the compute resources 516. The resources 510 may span different positions in the system and may include different types of resources. Each of these resource types can be optimally allocated in and of themselves.

The use of network resources 512, in and of themselves, may be optimized in various way. The best network, compute, or storage may be chosen to deliver networking to the user, if the user or device is accessible via multiple paths based on the performance of such systems. The cost of using the network, compute, or storage may also be considered. Aggregating bandwidth across multiple networks, computes, and storages (pathways available to the user) may allow multiple paths to be used simultaneously. Harvesting underutilized or dormant networks, computes, or storage capacity, e.g. using paths when regular use is low, on a consistent basis allows a cost effective use of the network resources. The mode of transmission to use during the communication of content may be chosen to use the network resources more efficiently. For example, unicast vs broadcasting (point-to-point vs. point-to-multipoint may be selected depending on various factors. Broadcast transmission provides high spectral efficiency, i.e. higher bits/sec per Hz of spectrum. Given that there is typically a cost incurred per frequency of spectrum, extracting a higher bits/sec throughput per Hz results in a lower cost per bit.

In the network described herein, the available storage and compute power of wireless-connected devices is tracked by the system, and the wireless network is constantly transmitting data, whether to serve requests by users for real-time consumption or to pre-position data into the available storage of wireless-connected devices. The wireless network is constantly determining whether content should be pre-positioned to one device vs. another device using the remnant capacity for non-real-time consumption, based on such a likelihood of a device being able to fulfill the most number of applications' requests for real-time consumption in the future, or based on its likelihood of being able to fulfill the most valuable real-time consumption requests in the future, including during the most valuable time for such fulfillment (instead of using the wireless network at such time for real-time consumption). When applications are making requests for real-time consumption, the network figures out whether fulfilling such data requests is better directly from a nearby available storage containing the requested data or instead using the wireless network for transmission of such data, and directs such application to receive such data from either the nearby available storage or from the wireless network itself Wireless networks may also track the mobility of devices, and use opportune times when devices are available to receive remnant capacity transmissions for data pre-positioning, to pre-position data in such devices, knowing the devices will not be accessible for such pre-positioning in the future, but may indeed be able to fulfill future requests from applications for real-time consumption in the future directly from their storage. This may include a mobile device, that is often in a disadvantaged location with poor wireless signal and inferior throughput and spectral efficiency from the network, receiving a larger portion of pre-positioned data traffic than other devices, when such a mobile device is in an advantaged location with excellent wireless signal and superior throughput and spectral efficiency from the network.

The storage resources 514, in and of themselves, can be allocated in optimal ways to ensure cost and performance optimization, and economies of scale. Typically, greater economies of scale (and cost efficiencies) may be gained by storing deeper in the network (e.g. on arrays in the cloud). Deeper is relative to the end user or user device. However, the future network is likely to provide storage opportunities in different parts of the system (network nodes, access points, small cells, base stations and end devices).

While storage space may normally be more limited and expensive in, for example, edge nodes in the network like small cells, home access points and end user devices themselves, a strategy that harvests unused (dormant) storage capacity in these devices (with resultant lower costs or no costs) can make sense, especially when storing closer to the user makes the delivery process more cost/performance optimal. This can be both for their own benefit, and for the benefit of nearby devices which can be served from those end user devices' storage.

The available storage of devices may be filled with partial data of any given content. In this case, the network could direct an application to access one part of the data from one device with the partial pre-positioned data, and to access another part of the data from another device with the remaining partial pre-positioned data.

Even for a given bundle of content, pieces of the bundle can be stored at different places in the system. For example, in the case of streamable multimedia, metadata, content guides etc. can be stored locally on an intermediate storage device in the home, or on an end user device; whereas the main content could be positioned at some point in the system.

As in the case of storage, computing points (the compute 516) can also be selected in a distributed fashion and aligned with where different content pieces get stored. The compute refers to the applications and hardware to process or move content toward the endpoint. Unused/dormant compute capacity can be tapped into at different points in the system.

As in the case of the storage resource 514, the capacity of the compute 516 can also be leveraged in a "split" fashion, e.g. in the case of an online, multiplayer game, components related to rendering and local processing can undergo processing on the local device; whereas functions common to all the players, and which relate to the overall game status, could execute deeper in the network.

Figure 6:
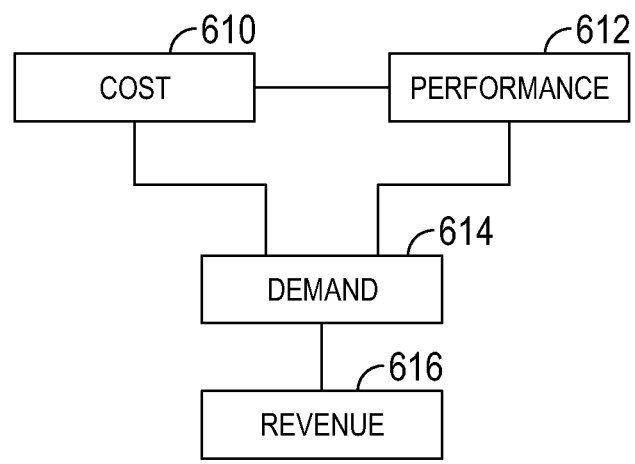
FIG. 6 is a block diagrammatic view of cost, performance and demand that considered when determining a content storage location.

Referring now to FIGS. 5 and 6, the different resource types 510 (network 512, compute 516 and storage 514) can also be combined in a cohesive manner to deliver a cost 610, a performance 612 service that is optimized based on demand 614 to meet the requirements of the user or service in question. Ultimately, revenue 616 is provided by such a system.

Figure 7:
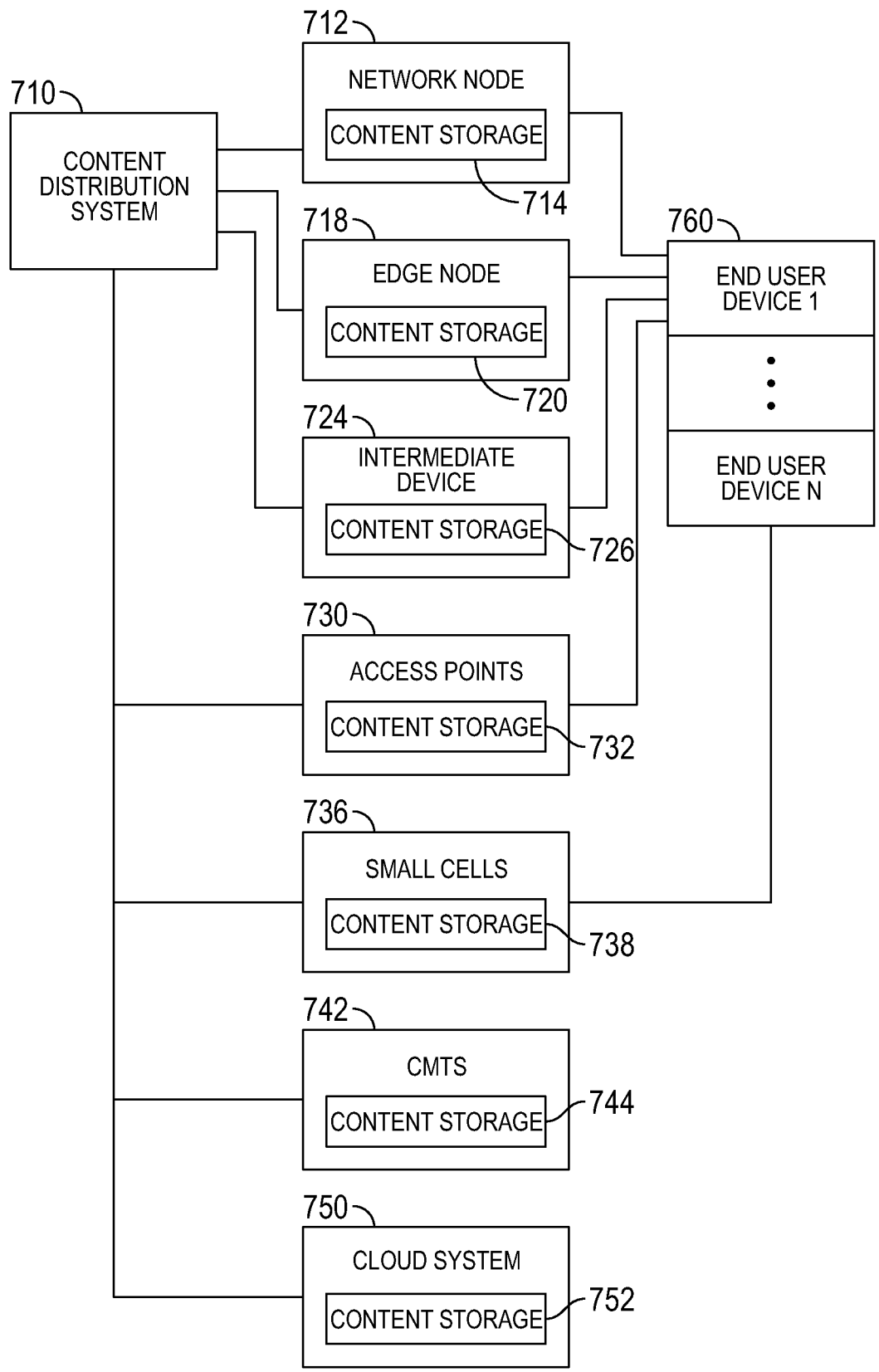
FIG. 7 is a block diagrammatic view of a simplified communication system with a content distribution system ultimately communicating with end user devices

Referring now to FIG. 7, a content distribution system 710 is illustrated. The content distribution system 710 is the system that is used for distributing content throughout communication system 10. The content distribution system 710 may be a standalone system or may incorporate various aspects of FIGS. 1-3 above. That is, the content distribution system 710 may include one or more aspects of the communication system provider 12, the first content provider 212A and the second content provider 212B, as well as the content provider 90 and the communication system provider 12. The content distribution system 710 is used for determining the resources and timing for providing content to the storage devices and from the storage devices to the end user. As mentioned above, the two functions may be separated in time. That is, the content may be provided to the content storage at a time that is different from the time that the content is ultimately communicated to the end user. This may be referred to as non-real-time content distribution.

The content distribution system 710 determines whether to serve the content from the network or from the storage depending on the speed, the capacity and the costs of the aspects of the communication network and the delivery. The resources may be optimistically levered at different points of the network. Both the storage costs and the communication costs may be taken into the consideration. Ultimately, the optimum combination of resources are leveraged for the distribution of a particular content.

The content distribution system 710 communicates to various network resources that may include, but are not limited to, a network node 712 that has a content storage 714 associated therewith. The network node may be a wireless or a wired network node. The network node may control access to a particular type of wired or wireless network.

An edge node 718 may provide access to the edge of a network. The edge node 718 may include content storage 720 for storing content therein. An intermediate device 724 may be one of the devices described above in FIGS. 1-3 as the intermediate device 724 may be incorporated into various types of devices as mentioned above. The intermediate device 724 has content storage 726 associated therewith.

The content distribution system 710 may also be in communication with access points 730 that have content storage 732 associated therewith. The access points 730 may be an access point for accessing various types of networks including a wired or wireless network.

The content distribution system 710 may also be in communication with small cells 736. The small cells 736 may be also be associated with content storage 738.

The content distribution system 710 may also be communication with a cable modem termination system 742. The cable modem termination system (CMTS) may also have content storage 744 associated therewith. A cloud system 750, having a content storage 752, may also be in communication with the content distribution system 710. It should be noted that all of the nodes or devices 712-750 are illustrated in parallel. However, these devices may also be combinations of parallel and serial distribution points. For example, a Wi-Fi access point 730 may be located downstream of a network node 712 or an edge node 718. A plurality of user devices 760 may be located throughout the communication system. In this example, a number of user devices 760 are provided within the system. The user devices may be located at different portions of the system and may be associated with one or more of the nodes or devices 712-750.

Figure 8:
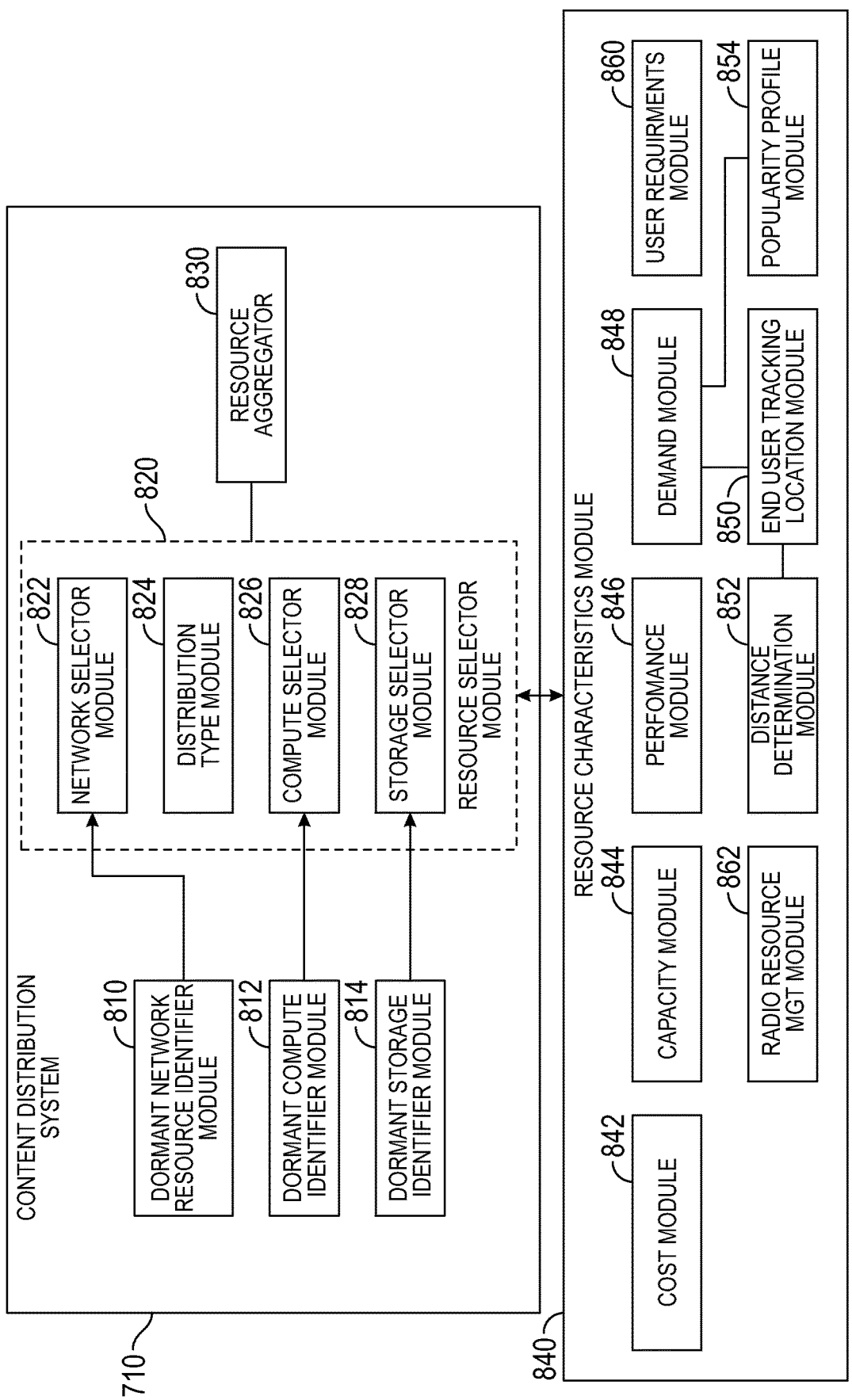
FIG. 8 is a block diagrammatic view of a content distribution system.

Referring now also to FIG. 8, the content distribution system 710 is illustrated in further detail. The content distribution system 710 determines a combination of the compute, storage and network resources to communicate content and store the content therein. In another aspect, the content distribution system 710 also determines the communication resources to communicate the content from storage to the end user devices. In this example, the system includes a dormant network resource identifier module 810, a dormant compute identifier module 812 and a dormant storage identifier 814. The content distribution system 710, as illustrated in FIG. 7, is in communication with the various nodes and devices 712-750. Probe signals may be generated at the content distribution system 710 to obtain the network resources that are dormant, the compute resources that are dormant and the amount of storage that is dormant within the communication system. Each of the modules 810-814 may generate a probe signal. However, one probe signal may be sent for determining all the dormant resources within the network as provided in this example.

A resource selector module 820 is used for selecting the resources for storing the content or communicating the stored content to an end user device. The resource selector module 820 includes a network selector 822 for communicating the network or networks through which the content is communicated in route to the content storage or from the content storage to an end user device.

The resource selector module 820 may also include a distribution type module 824. The distribution type module 824 may select the distribution type for the network. For example, the distribution type module 824 may select broadcast or unicast based upon various characteristics described below.

A compute selector module 826 is used for selecting the compute to be used for communicating the content to the content storage or communicating the content from the content storage to the end user. As mentioned above, the compute comprises the program or programs for applications used for storing the content or communicating the content to the end user.

The resource selector module 820 may also include a storage selector module 828. The storage selector module selects the location for storing the content. The storage selector module 828 also selects the storage from which to communicate the content to the end user device. The determination of the resources is determined for a particular time in the network whether it is for content storage or for distribution to one or more end users. A particular time may be selected for distributing the content. In certain situations a time can be chosen to may better use of various system, network, compute and storage resources.

It should be noted that the network selector module 822, the compute selector module 826 and the storage selector module 828 may select different resources from different parts 712-750 of the network. For example, the compute may be part of a cloud system 750 whereas the storage may be located associated with the network node 712. Likewise, the storage may be located in the cloud system 750 as the content storage 752 but the compute resource selected may be located in a physical location associated with a different component of the network 712-742.

The content distribution system 710 includes a resource aggregator 830. The resource aggregator 830 selects the network, compute and the storage resources for communicating content to the storage or communicating the content from the storage to the end user device. The resources, as mentioned above, may be aggregated from different positions within the network.

A resource characteristic module 840 is used for determining the resources at the resource selector module. The resource characteristic module may provide a cost for providing the resource at the cost module 842. The cost module 842 may determine a dollar cost or an opportunity cost for providing content. Although a cost module 842 is illustrated within the content distribution system 710, each of the resources, such as the network, compute and storage, may provide cost data of costs to the content distribution system 710.

A capacity module 844 is used to determine the capacity of the network associated with the communication system and the capacity of the storage that is available throughout the network. A performance module 846 determines the performance of the resources of the system. For example, the performance module 846 may determine the transmission speed of a network, the speed at which the compute can store the content, and the speed that the content storage can store the content.

A demand module 848 may determine a demand for a particular content. The demand module 848 may be associated with or determine demand from a wish list for each of the devices within the network. The demand module 848 may also be associated with an end user tracking and location module 850. The end user tracking and locator module 850 can track the mobile end users and the stationary end users to determine the amount of demand within a geographic area. A distance determination module 852 may determine a distance to the end user or the content storage system. The distance determination module 852 may also determine the distance from the content storage to an end user. By knowing the demand at the demand module 848 and the geographic location of the demand and the potential movement of the end users, content may be strategically located. An example where this may be useful is in a particular neighborhood with a particular ethnicity or sport team affiliation. For example, a high school football game may be relevant to people within a limited amount of square miles nearby a certain school.

A user requirements module 860 may also be incorporated within the resource characteristic module 840. The user requirements module 860 may associate various user requirements with each end user or end user device. The user requirements module 860 may include the definition of the service to which the subscriber has subscribed. For example, some users may value rapid response in terms of updating or providing content. This may signal the content distribution system 710 to locate the content closer to the end user.

A popularity profile module 854 may also be communication with the demand module 848. The popularity profile module 854 may determine a popularity of a particular content. The popularity of a content may be used from audience measurement or from a predictor of popularity as determined by a human entity. For example, the providing of Olympic content during the Olympics may have an increased popularity. On Sundays in the United States, National Football League content may be more popular.

The resource characteristic module 840 may also have an efficiency module that is used for determining a consolidated efficiency metrics that is used for the determination of which combination of resources to use. The costs per byte per user may be determined.

A radio resource management module 862 may also be included in the resource characteristic module 840. The radio resource management module 862 may take into consideration a service resource agreement from various service sources and various service level agreements from the devices and nodes 720-750 of FIG. 7 in order to determine whether to use a particular resource.

In summary, the content distribution system 710 determines, for any content to be distributed, the optimum combination of resources to leverage at a particular time. For example, if cost minimization is the prime consideration, positioning content as close to the user as possible (e.g. in an intermediate storage device in the home, office, or in the user's end device itself) might make the most sense. In this scenario, performance optimization is a natural by-product, since delivering the content from close to the device will maximize throughput and minimize latency and jitter effects.

On the other hand, if the piece of content has a high enough popularity level (i.e. a large number of users are likely to watch it), it could make sense to locate the content a bit deeper in the system (e.g. in one of the access network nodes or even in the core cloud). In this case, even though the networking cost can be higher, it can be amortized across a larger number of paying users.

It is therefore helpful to view the decision determination in terms of a consolidated efficiency metric that enables the content distribution system 710 to decide which combination of resources to use. An example of a metric is cost/bit/user—or some equivalent of this. The cost/bit component reflects the price and performance aspect of the delivery option and normalizes the cost incurred relative to the performance rendered. The "User" denominator then normalizes the metric further, to factor in demand/popularity, and the number of users interested in the content.

In terms of a distribution and delivery strategy, various principles may be followed. Such principles may include pre-positioning content, using dormant or excess network capacity (or, at least, the least expensive network path(s)), at one or more sites, edge nodes, home access points, or end user devices—the idea being to move content as close to the interested user population as possible, using free or inexpensive resources.

Another determination in the distribution and delivery strategy is leveraging the dormant storage and computing where the dormant storage is available in the system. The best location or locations for pre-positioning is determined in view of the cost and performance of the ultimate delivery to the end user device.

Another determination is picking the best time to pre-position content (a pre-position time) while factoring in available dormant (network, storage and compute) capacity and the ability of the storage device to efficiently receive data to be pre-positioned. The location may also be a consideration. That is, communicating when the device is in strong radio conditions may be important. The end user device may be exposed to varying conditions when mobile. An example of a determination could be: does the distribution system deliver live from the network at the time of consumption, vs. store now at Location A and deliver at consumption time from A, vs. store now at Location B and deliver at consumption time from B, vs. store now at Location C and deliver at consumption time from C, and so on. Basically a "least cost route" option is set forth that factors in how many users can be covered from each location or route.

Another determination is the best network path to leverage to pre-position content in the device. When the user is ready to consume the content, delivery is enabled with minimal cost involved, e.g. if the caching was done at storage local to the user, network costs at consumption time would be zero or minimal.

In the following, a few use cases are presented. The first case is wishlist content. For wish list content that is part of a user's wishlist (e.g. specific movies, episodes of a TV show etc.). The content distribution system 710 may determine that the optimal approach here is to pre-position this content to the user right away, after the user indicates that their desire for a particular content since the user does not need to immediately consume the content.

The content distribution system 710 may decide to pre-position or cache the content in, e.g. an intermediate storage device in the user's home, or in the end user device itself (if the user is known to regularly use a specific device to consume streaming content). The deeper in the content is positioned, the lower the eventual cost of delivery (e.g. delivery from local storage—no network costs involved) and the better the user's quality of experience.

When the content distribution system 710 determines that this content has a high enough popularity level, the content distribution system 710 may cache the content at a further upstream point in the network (relative to the end user devices), e.g. a base station, or a wireless network node. Upstream storage allows for the content to be available to a larger number of users. The content distribution system 710 may also decide to cache portions of the content bundle at different locations, e.g. position metadata, program information etc. locally on the end user device, and the core content further upstream. Such decisions may be performed at the resource aggregator 830.

In either case, the content distribution system 710 could make a decision to deliver content to any (or more than one) of the storage nodes mentioned earlier, based on the cost and performance tradeoff of such a delivery with the cost and performance of the storage and its compute. The likelihood of the storage being able to fulfill a real-time video serving request and the volume of users that would be addressable by the storage, may also be considered. For each potential content storage positioning location being considered, the content distribution system 710 takes into account the cost of storage, and (at the point of delivery to users) what the compute and network delivery costs would be. The popularity level (consequently how many users would have access to the content from each location) can also be factored in to a decision to deliver content using unicast delivery or broadcast delivery, since broadcast delivery is somewhat less efficient than unicast delivery to a single node, but much more efficient than unicast delivery when attempting to deliver something to multiple nodes simultaneously, since the delivery efficiency would be higher (and the cost would be effectively amortized) if a larger number of users can be serviced.

For example, if the cost of storage in the home is $1, the cost of real-time delivery is $10, and the cost of pre-positioning using dormant capacity is only $2, then the likelihood of video consumption (for example 50%) may be taken into account. The effective cost of real-time delivery compares to a $6 cost (($1+$2)/50%) of pre-positioning and subsequent serving given the likelihood of such an event. Now if this example is expanded, and the cost of pre-positioning using broadcast over dormant capacity is $6 (since less efficient for any 1 user), but 100 users can be addressed by the broadcast, and the likelihood of video consumption is 33% across the group of 100, then the effective cost of pre-positioning and subsequent serving given the likelihood of such an event drops to $3.18 (($1+$6/100)/33%). Finally, if the cost of storage in the home is entirely a sunk cost, and is shouldered by the user, the above costs or pre-positioning and subsequent serving drop further to $4 and $0.18, providing dramatic cost and performance improvements.

For gaming applications, the content distribution system 710 may decide to pre-position or cache a gaming application requested by the user. In this case, the content distribution system 710 may place real-time-critical and bandwidth intensive components of the application such as but not limited to graphics data and intensive user interface and rendering components close to the user (e.g. in an intermediate storage device in the home, or in the user's commonly used gaming device(s)) and place the compute-intensive pieces further upstream, where a larger pool of compute and memory resources may be available. In this manner, the caching device location can be used to store just a portion of the total content, application or web payload while the low-bandwidth portion of the payload can be served from the origin server, which may provide higher compute capacity.

Another use case is for pre-positioning software updates. A software service provider may need to do this from time to time. That is, software updates may be required for end user devices. Dormant network capacity may be used to pre-position a software update in a user device or in an intermediate storage device close to the user. The user can incorporate the updates at a subsequent time of their choosing.

In general, the decision to pre-position content may be driven by a user, or users, placing the content on their wishlists, or the content distribution system 710 proactively deciding to place the content in suitable locations based on the content's popularity profile relative to the population of user and specific personalized reference for any given use and hence, expected demand in the near future. In every case, the content distribution system 710 will need to select the combination of storage and compute resources in the system based on various factors including candidate storage locations having the requisite storage capacity. Another factor is the cost of storage. Another factor is whether dormant (unused) storage space available at that location and whether the dormant capacity can be leveraged free of charge, or at a lower cost.

With respect to compute capacity or power similar factors may also be consider. These include if the location has sufficient compute capacity or power to support delivery of the service when the user chooses to consume the content. Also, a more upstream location, with a larger aggregate compute capacity may be chosen instead of a closer location.

With respect to the network when the user decides to consume the content, the network communications cost be at that point and for real-time consumption may be considered. The cost of pre-positioning distribution using dormant capacity and the dormant (unused) capacity available at that point in time may also be considered along with the relative cost of such distribution. The cost efficiency may also be considered for pre-positioning distribution using broadcasting or unicasting. If the user requires content quickly, the cost of communicating the content in real-time Another consideration is how many other users are likely to be interested or consume the content. This may be referred to as likelihood of consumption or likelihood of content or video consumption.

Clearly, the trade-off factors here are compute or storage capacity and cost, vs. networking cost, and the content's popularity profile. Typically, upstream caching device locations are likely to provide large storage and compute banks, suitable especially for compute-intensive applications. However, the networking expense could be higher (at the time of content consumption) and performance may be inferior (if the content has to traverse a long segment of the network). But, at the same time, a larger population of users could be served, when the service delivery location chosen is further upstream.

The end result of these determinations is that the content is cached at one or more locations in the system. Typically, an access network edge node (e.g. small cell, base station, access point) used as the caching device location might provide more limited, and more expensive, compute and storage resources. However, the communication costs might be lower, and performance is likely to be better, compared to a more upstream location, because network backhaul costs and latencies are being cut out of the equation.

The related decision the content distribution system 710 must also select the mode of transport such as unicast or broadcast. If the pre-positioning location is in the network, a point-point (unicast) approach can be applied. If the decision is to locate the content in the user's end device or intermediate storage device in the home, the content distribution system 710 may decide to opportunistically push the content to multiple users (especially if the content's popularity profile is high) using a much more spectrally efficient broadcast approach when distributing the same data to multiple users at once.

When the user is ready to consume the content (i.e. requests delivery), the content distribution system 710 delivers from the most appropriate storage location. The content distribution system 710 will look at all points where the content is currently cached or is available (including the origin server in a cloud location), and determine the best location from which to deliver from based the communication system conditions at the time. The conditions include the network delivery cost from each candidate location and the current compute power available at the candidate location, vs. the computing needs of the application. The content distribution system 710 then delivers the content using the best (possibly least expensive) network resources available that can handle the performance requirements. If delivery is from local storage, networking resources may not be needed.

The live streaming (consumption) case is a subset of the content delivery scenario described above. If the user is requesting content that has not been pre-positioned anywhere, the content distribution system 710 delivers it from the origin server in its cloud.

As part of delivery of the content, the content distribution system 710 may choose to opportunistically cache the content in targeted locations, which it retrieves to serve to any given requesting user at that time, in anticipation of future needs for the same content by other users. For example, the content may be post-positioned in an upstream node in a wireless network (e.g. a PDN Gateway or User Plane Function) but much closer to the user than the content origin server such that it can be delivered to a larger interested population of users from a closer point of access when the system is responding to a first user requesting such content and the system needing to retrieve such content from the content origin.

Figure 9:
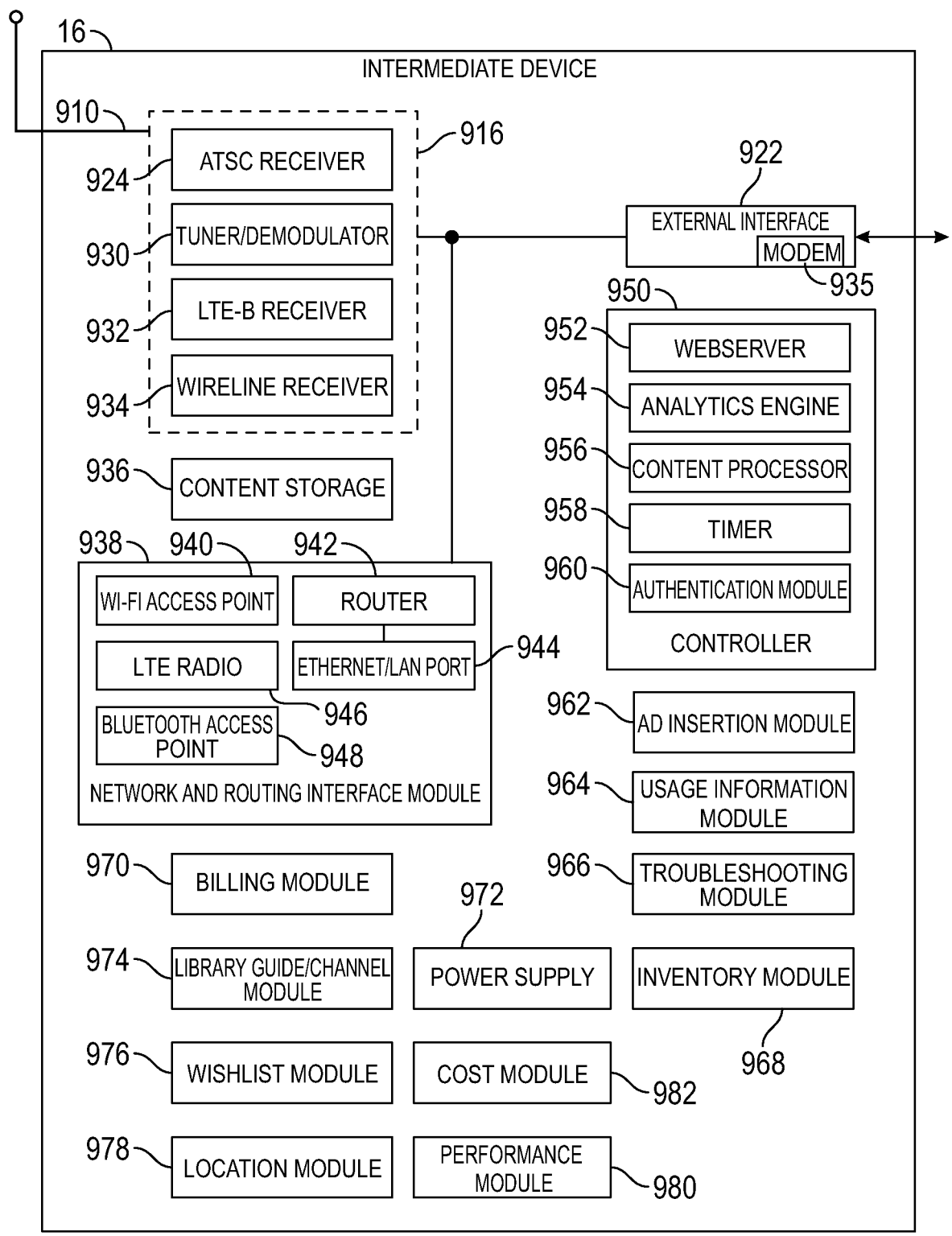
FIG. 9 is a block diagrammatic view of a device within system such as the intermediate device.

Referring now to FIGS. 9, the intermediate device 16 is illustrated in further detail. However, the block diagram is also applicable to the node/devices 712-750 and an end user device 760 of FIG. 7, at least in part or in full and therefore specific block diagrams for those devices are not provided. An antenna 910 such as a television antenna or an LTE antenna may be used and interface with the interface 916. The interface 916 may thus be configured to receive LTE-B (eMBMS or MBSFN) or may interface with an ATSC receiver 924 or an LTE-B receiver 932 or for receiving over-the-air television signals with dormant capacity. The ATSC receiver 924 may be an ATSC 3.0 receiver. Thus, the intermediate device 16 may have a tuner demodulator 930 for tuning to and demodulating the signal received over the external input interface 922.

The tuner demodulator 930 may also tune and demodulate the L-band signal or an ATSC signal received through the input interface 922. The tuner demodulator 930 may also have error correction therein such as forward error correction (FEC). The LTE-B receiver 832 for receiving external inputs from the interface 922. The LTE-B receiver receives the broadcast signals over an ATSC system. A wireline receiver 934 may be used to receive networking traffic. The wireline receiver 934 receiver may be a USB or HDMI interface.

The external interface 922 may also represent a connection to the Internet 18 through the wired or wireless communication network. That is, the external interface 922 may comprise a modem 935 for communicating content to the intermediate device 16.

The intermediate device 16 includes content storage 936 that is used to store content therein. The content storage 936 may include solid-state devices or a hard disk drive.

A networking and routing interface 938 may include various network and routing access points. For example, a Wi-Fi access point 940 may be used to interface with a router 942. However, the router 942 may also be used for wired communications using the Ethernet/LAN port 944. The networking and routing interface 938 may include an LTE radio 946 for communicating LTE radio signals from the device. The LTE-B receiver 932, as well as the LTE radio 946, may be incorporated into a signal unit. The intermediate device 16 may also communicate using Bluetooth. That is, a Bluetooth access point 948 may be incorporated into the network and routing interface module 938.

The intermediate device 16 may include a controller 950. The controller 950 may perform many functions, including as a web server 952, an analytics engine 954 and a content processor 956. Although individual interconnections are not illustrated in FIG. 9, the controller 950 may control the underlying timing and functions of the various modules within the intermediate device. The web server 952 may communicate content from the intermediate device in an IP format. The controller 950 may also tune to the data at predetermined times as determined by the timer 958. The timer 958 may be synchronized with various other intermediate devices within the system using GPS or internet-based time standard. The content processor 956 tunes to receive the content at predetermined times, manages the storage of the content, verifies the integrity of the stored content and receives and manipulates manifest files, which provide instructions for downloading the content. The analytics engine 954 handles the intermediate device-based analytic functions for the system.

Neighboring intermediate or other devices may also receive and transmit from the intermediate device 16. The network and routing interface 938 may communicate with other intermediate devices for receipt of content, content chunks or missing content at the content storage 936. Missing content may occur when network errors, hardware errors or weather prevent the content from being received at the content storage 936. Communication with other intermediate devices may take place using the web server 952 using an internet protocol.

The network and routing interface 938 may communicate a request signal to the communication system provider 12 or the content service provider 90 to request content chunks or missing content at the content storage 936. The communication system provider may communicate the requested content in a unicast manner using dormant capacity to the requesting intermediate device. A complete broadcast retransmission may also be performed in response to the request. Retransmission may occur if a significant number of intermediate devices request particular content.

An authentication module 960 may also be included within the controller 950. The authentication module 960 may communicate authentication signals to the communication system provider or for the content service provider so that the devices may intercommunicate properly. An unauthorized device may not be able to receive content from the communication system provider.

An ad insertion module 962 may be used for inserting ads at predetermined times during a broadcast. The ad insertion module 962 may splice ads based upon user preferences that are predefined. The ad insertion module 962 may act in response to a trigger for inserting advertisements that may be stored within the content storage 936.

A usage information module 964 may provide the communication system provider 12 or the content service provider 90 with information as to the usage of various information and programming within the intermediate device 16. By providing the usage information, content of interest may be communicated to the intermediate device 16. Usage information may also be data related to monitoring the utilization of the network that communicates the signals to the intermediate device 16.

A troubleshooting module 966 is used for transmitting troubleshooting information over the outbound signals to the analytics engine for analysis to identify problems with sourcing video files or the installation of the intermediate device 16.

An inventory module 968 stores an inventory of the content stored within the content storage 936. The inventory module 968 may also be used to remove content that has expired per the metadata received with the content. After the content expires, the inventory module 968 removes the content to free space within the content storage 936.

A billing module 970 may transmit billing information from the intermediate device 16 to the content service provider 90. The billing module 970 may collect viewed content and other information to provide billing to the owners of the intermediate device 16. The billing module 970 may also report inventory data from the inventory module 968 to the intermediate device.

The intermediate device 16 may also include a power supply 972 for powering the various modules therein.

The intermediate device 16 may also include a library guide/channel module 974. The library guide/channel module 974 will be described in further detail below. The library guide/channel module 974 may be used to assemble a program guide or virtual channel based upon the contents stored within the content storage 936.

The intermediate device 16 may also include a wishlist module 976. The wishlist module 976 may allow the user of the intermediate device or other device to establish a wishlist for content to be received in the future. As mentioned above, the wishlist set forth in the wishlist module 976 allows the content distribution system 710 to pre-position desired content by the users.

A location module 978 may also be provided in the intermediate device 16. The location module 978 may be coupled to a GPS of a mobile device. The location may vary due to movement and thus the delivery of content and the resources associated therewith may be adjusted as mentioned above. In a stationary device, the location module 978 may be configured during setup with an address. Both the wishlist module 976 and the location module 978 may be coupled to the content storage 936 for storing the data therein.

A performance module 980 may also be disposed within the intermediate device 16/user device 80. The performance module 980 may monitor the network conditions both upstream and downstream of the device. The performance module 980 may communicate back to the content distribution system 710 a signal that corresponds to the performance feedback or radio metrics of the communication network or networks. An efficiency metric may be determined that corresponds to the efficiency of that portion of the communication network associated with the particular device. The performance module 980 generates a data signal that provides data corresponding to the upstream or downstream efficiency of the network of the system around the particular component of the communication network. The efficiency metric data is communicated to the content distribution system 710. Examples of performance feedback or radio metrics include but are not limited to signal-to-noise ratio (SNR), signal-interference-to-noise ratio (SINK), channel quality indicator (CQI) and other related metrics.

A cost module 982 may also be incorporated into the intermediate device 16. The cost module 982 may have a cost associated with the use of the network, a cost associated with the use of the compute, and a cost associated with the use of storage. The cost may vary depending upon the time of day and various system resources. The cost may be provided in monetary terms or in some relative data.

Figure 10:
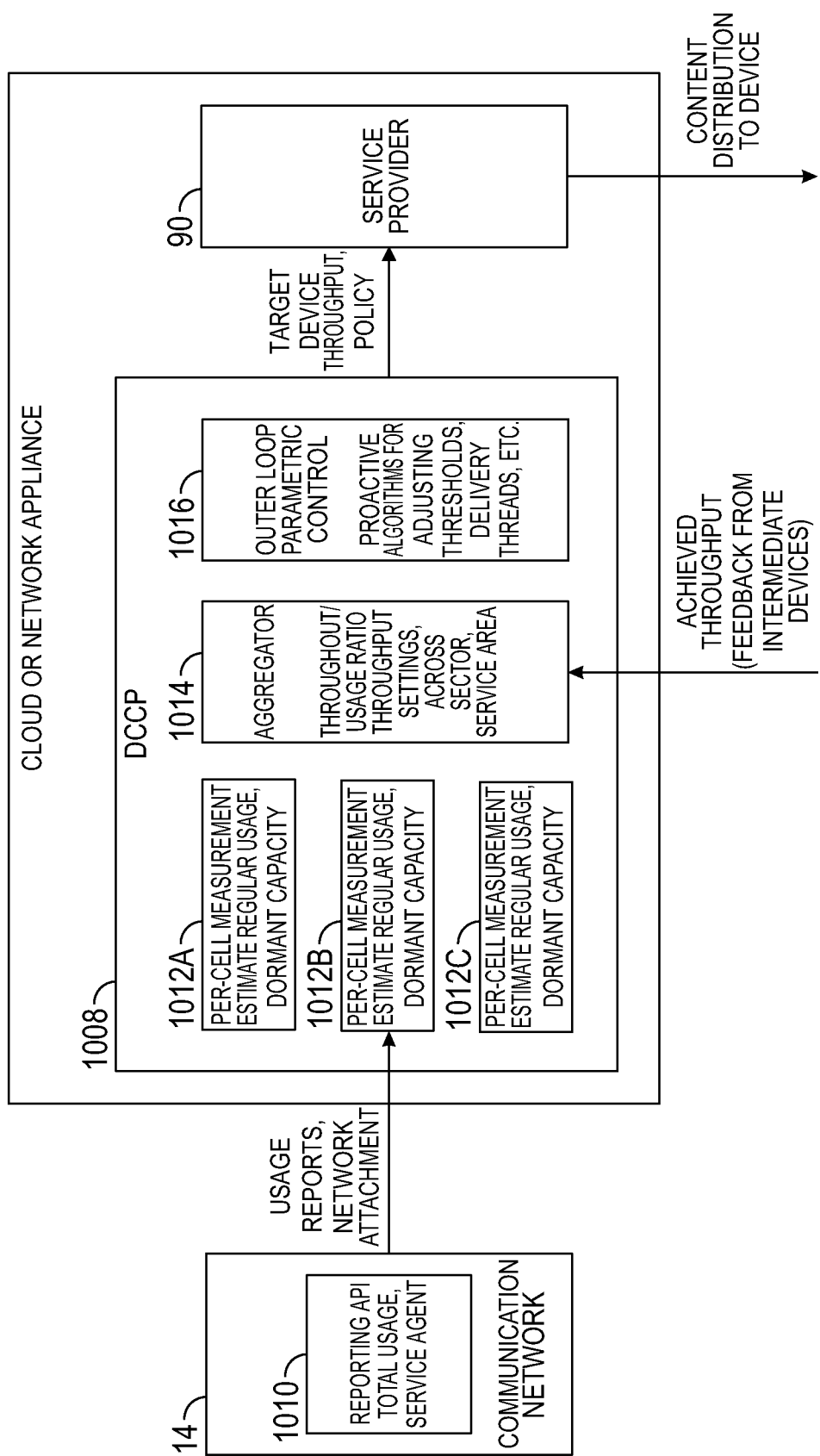
FIG. 10 is a high-level block diagrammatic view of a dormant capacity control protocol system.

Referring now to FIG. 10, dormant capacity can be capacity available outside of the capacity that is required to serve a similar type of traffic that is increasingly served during peak network use and served less-so during non-peak network use. Dormant storage capacity can also be capacity available for content pre-positioning at the intermediate devices and within their content storage and subsequent consumption of that content by users directly from the intermediate devices, and which is not the capacity required for real-time voice and data requests from users or for distribution of content to users and for its immediate consumption. To identify dormant network capacity user demand patterns of the "primary, non-dormant" network may be reviewed. Dormant network capacity may be automatically identified on a real-time basis by receiving information as to the amount of network not being consumed for "primary, non-dormant" use. The identified capacity may be automatically provisioned for use as the dormant capacity in response thereto. "Primary, non-dormant" capacity may run in parallel to "dormant" capacity use such that both are running across the entirety of the resource the entirety of the time but assigning a lower QoS value or identifier to the dormant capacity use so that dormant capacity is only used whenever such resources are not being used by a higher QoS "primary, non-dormant" use such as cellular, television broadcast, cable satellite and the like.

The dormant content delivery system may also be used for delivering device, software and application updates that are associated with the intermediate device or user devices associated with the intermediate device. An inventory list may also include device identifiers, software identifiers and application identifiers. The inventory list may also list the devices associated with the various software and applications.

In FIG. 10, a dormant capacity control protocol (DCCP system) 1008 is used to harvest unused or dormant capacity in networks so that content is stored in the intermediate devices 16 or the devices 712-750 in locations close to where the user consumes the content using an unconstrained medium, such the local area network 310 (WiFi, Ethernet etc.). In the example set forth below, the DCCP system 1008 manages dormant radio resources in a wireless cellular network. However, the teachings are equally applicable to other types of networks, such as satellite systems or combinations of different types of network such as those described above.

The content distribution service of interest (referred to herewith as "service") provided by the content service provider 90 uses inputs from the DCCP system 1008 to determine how much data can be delivered and pre-position content using dormant capacity. The goal is to leverage as much of dormant capacity as possible, without contending with regular network traffic at all. The system continually adjusts its operational parameters and capacity usage targets, based on metrics received from the network 14 and the intermediate devices 16, to provide elastic dormant capacity management. The desired dormant capacity may vary by time of day and may be determined by input from the operator of the communication system 12. For example, at certain times of the day more dormant capacity may be used as a buffer, such as in rush hour, than other times of the day such as after in the overnight hours.

DCCP system 1008 uses reports from a reporting application interface (API) the network 14 on resource usage to determine network capacity usage—and hence estimate available dormant capacity. The network capacity may be calibrated when no service data is being communicated. This may be performed at various times. In an exemplary cellular network, the reports are communicated using report signals and may by provide data, for example, on physical resource block (PRB) usage within the radio network, received from the network 14 on a per-cell basis. In a cellular network, PRB usage is most effective as a capacity usage measurement metric, since it gives a concrete view of how much of a radio capacity of a cell is being used. DCCP system 1008 uses the metrics to determine the rate at which the service provider can deliver data to devices through the network 14.

The DCCP system 1008 uses resource usage reports to determine the total usage level in the network 14 (referred to herewith as "total usage"). The DCCP system 1008 also determines, from the report data, the level of the capacity of the network being used by regular traffic (e.g. in a wireless network, the percentage of a cell's radio resource blocks used by regular traffic). The regular capacity associated with the communication system provider is referred to as herewith as "regular usage". The DCCP system 1008 then determines the maximum dormant capacity (in this example, in terms of the percentage of network resources) available for use by the service provider 90. This is the available dormant capacity, which may be expressed as the percentage of the total or overall system capacity, and is referred to herewith as a maximum dormant capacity) Max Dormant Capacity.

An upper bound can be used for the Max Dormant Capacity. For example, a 70% threshold could be employed, which means that the DCCP system 1008 will seek to maintain total usage within 70%, while staying as close to that upper bound as possible. In this example, the total usage amount is referred to as the "total usage threshold". Of course, absolute units of capacity may be used. By setting the threshold in this manner, sufficient buffer room in the network 14 accommodates sudden spikes in regular usage.

The upper bound provides a "breathing" or elasticity mechanism. That is, the increases or decreases of the network load are continuously monitored so the level of dormant capacity is continuously calibrated. The service provider 90 utilizes changing dormant capacity to the fullest extent possible while not causing contention with regular network traffic or creating disruptive traffic spikes. The maximum dormant capacity may be expressed as Max Dormant Capacity=total usage threshold—regular usage The DCCP system 1008 also uses the network reports to estimate the level of usage of network resources by the service provider 90 (referred to as "service usage"). In an exemplary cellular network, service usage would signify the average instantaneous percentage usage of a cell's capacity by the Service. The DCCP system 1008 measures the actual throughput (amount of data over time) achieved by each device such as an intermediate device 16 (referred to from here on as "intermediate device") that receives a delivery during the reporting period. Each intermediate device 16 may communicate the throughput as an achieved throughput signal that is ultimately communicated to an aggregator 1014 of the DCCP system 1008.

Service usage can either be reported explicitly by the communication network 14, or can be estimated by DCCP system 1008 from total usage and regular usage, e.g. service usage=total usage−regular usage. If the communication network 14 reports to the DCCP system 1008 the total usage and regular usage for a reporting period, service usage can be accurately determined.

If only total usage is reported by the communication network 14, the DCCP system 1008 can estimate service usage in one of two ways. In the first way, a previously reported (by the communication network 14) accurate value of regular usage, and subtracting this from total usage. This assumes that regular usage in the communication network has remained at that previously reported level since that reporting period. Regular usage may be determined by periodically measuring regular usage by deliberately not running service traffic (data) over defined intervals of time, and then measuring total usage during those periods. For those periods, regular usage=total usage. The periods of no service traffic may be referred to as Quality Control Gaps or (QC) Gap. The second way of determining service usage may be performed by applying that the system was attempting to target total usage at a level of (Max Dormant Capacity used in the current period+the previous period's regular usage), and using the delta (Δ) between actual total usage (reported for the current period) and this target to estimate regular usage and service usage. For example:

Delta(Δ)(for this reporting period)=total usage−(Max Dormant Capacity used in Current Period+Previous Period's regular usage)

regular usage(for this period)=regular usage(previous period)+Delta*<Factor-1, e.g. ½> service usage(for this period)=Max Dormant Capacity used in Current Period+Delta*<(1−Factor−1), e.g. ½>

The "Max Dormant Capacity used in current period," in turn, is estimated based on the Max Dormant Capacity value determined at the end of the prior cycle, i.e. the Max Dormant Capacity target coming into the current cycle. This number is adjusted downwards, based on downtimes in the current cycle when deliveries did not occur, and based on any throttling the Network might have done. The premise is that the system went in with a Max Dormant Capacity target, and the assessed dormant capacity usage is lower if either the full delivery cycle was not leveraged, or if a lower throughput than target was achieved (throttling). Also, if during the current delivery period, if updated capacity reports were received from the network that resulted in the Max Dormant Capacity value being modified, a weighted average Max Dormant Capacity value (based on the various Max Dormant Capacity values used during different deliveries in this period) can be used.

The idea is that the usage delta is being "debited" to both regular usage and service usage. On one hand, the Delta is being (at least partially) attributed to regular usage having increased or decreased relative to the last accurately measured value. At the same time, the Delta is being (at least partially) added to or subtracted from the value of Max Dormant Capacity, which is being used as the target capacity having been used by the Service, i.e. asserting that the Service has used more or less dormant capacity than was targeted.

With this approach, regular usage and service usage gets cumulatively adjusted period-to-period, based on the delta. This also means that Max Dormant Capacity is adjusted period-to-period, since Max Dormant Capacity=total usage threshold−regular usage.

The approach serves to continually adjust the operational settings of the DCCP system 1008 to counter spikes and dips in network capacity usage driven either by increases in regular network usage or service usage.

Throughput targets are set based on DCCP system 1008's learned correlation between achieved throughput and resource usage. DCCP system 1008 uses prior measurements of achieved throughput and resource utilization to establish a throughput to usage ratio. DCCP system 1008 then uses this ratio, in conjunction with available dormant capacity, to set and throttle throughputs to intermediate devices moving forward.

For unicast delivery, DCCP system 1008 learns the correlation between the achieved throughput for an intermediate device 16 and the network resource utilization for the delivery of content to that intermediate device 16 in prior reporting cycles. For a single cell wireless sector, for example, resource usage would be the usage in the cell of interest. For a multi-cell (multi-carrier) wireless sector, this would be the average resource usage across the cells in the sector. The throughput to usage ratio is an efficiency metric that reflects the quality of radio conditions that the intermediate device 16 has been experiencing. The usage is resource usage (Percent or a fraction of cell capacity used). A higher ratio value would indicate more favorable radio conditions, since the intermediate device 16 is able to extract a higher throughput for a given level of resource usage. This ratio is combined with available dormant capacity to determine the throughput target to an intermediate device 16 for a given content delivery cycle. The throughput to usage ratio is continually refined and fine-tuned, based on continuous (cycle-by-cycle) measurements of throughput and resource usage.

The throughput to usage ratio and associated adjustment procedures provide another level of elasticity or "breathing" to the system. This approach uses continual measurements of network resource usage (by regular network traffic and by the service), as well as intermediate device throughputs, to fine-tune the ratio and continually calibrate target throughputs.

The associated content distribution service provider 90 may utilize unicast or broadcast transport schemes to deliver and pre-position content to intermediate devices 16 using the dormant capacity. For example, modern cellular networks provide both broadcast and unicast transport types. With unicast, the service provide 90 delivers content to one device at a time. The service provider 90 can adopt a round-robin scheme to simulate broadcast delivery to devices. With broadcast, the same content stream is delivered to multiple devices simultaneously. Broadcast uses radio resources much more efficiently and delivers significantly improved spectral efficiency, since it uses the same set of radio resources to service many devices. The DCCP system 1008 manages dormant capacity to service both unicast and broadcast delivery approaches.

Within a delivery cycle, the DCCP system 1008 determines an appropriate mix of unicast and broadcast loads to be targeted by the service provider 90. This mix may be a proportion and can be managed to optimize for capacity (system throughput) or coverage. Such a decision would determine the broadcast/unicast "cutoff", i.e. the coverage threshold (e.g. signal strength, SINR) below which a particular device's link is deemed to be too weak for the device to be included in the broadcast group.

The proportion can be managed to optimize for capacity (system throughput) or coverage, or any other number of parameters including proportion of content to be delivered destined for one or a small number of intermediate devices, vs. proportion of content to be delivered destined too many intermediate devices, and the overall level of priority of that content. That is, if content to be delivered destined for one or a small number of intermediate devices becomes significantly higher priority than the content to be delivered to many intermediate devices, then unicast delivery can be used to deliver that content (since it's more efficient than broadcast for delivery to only one intermediate device or a small number of intermediate devices, until such priority is equalized, at which point broadcast can be used to deliver content to be delivered destined for many intermediate devices.

In essence, this becomes a linear optimization problem—optimizing the mix of number of devices included in the group, vis-a-vis the modulation and coding scheme (MCS) that can be applied to transmissions to the group (the MCS, in turn, directly influences the data rate), and the revenue obtainable to the service provider 90 from the service being delivered.

One dimension of the decision between broadcast and unicast may revolve around whether to choose a smaller broadcast group of devices with much better radio conditions (enabled for higher throughput covering fewer devices), and delegate the other devices to unicast, vs. choosing a larger broadcast group with a lower SNR/signal strength cutoff, enabled to receive lower throughput but covering a large number of devices—effectively maximizing the aggregate throughput achieved. The decision may be different for different communication system providers. One choice may be that may be used in determining broadcast versus unicast is when creating a smaller broadcast group of intermediate devices significantly higher-fidelity conditions (receiving a higher modulation and coding scheme (MCS), higher throughput) maximizes system throughput. Higher MCS use translates to higher spectral efficiency. Another choice may be when creating a larger broadcast group of intermediate devices, some in slightly weaker radio conditions (i.e. having a lower cut-off) produce a higher throughput product. Broadcasting delivers higher overall spectral efficiency metric, given the same set of radio resources being used to serve a number of users. Hence, a larger broadcast/unicast split would increase spectral efficiency.

The linear optimization is an attempt to arrive at the right mix that produced the highest throughput and spectral efficiency.

Another dimension of the broadcast unicast mix decision may revolve around revenue maximization. That is, a smaller broadcast group of premium (high-paying) users may be prioritized when higher aggregate revenue from the content being served is higher. Conversely, a significantly larger group of lower-revenue users may be chose to be unicasted when higher aggregate revenue is generated.

An additional constraint may be a predetermined upper broadcast capacity limit on the amount of broadcast capacity of the dormant capacity usable by the service provider 90 that is used. The predetermined upper broadcast capacity limit may be a percentage or fixed amount of system resources that are applied to broadcast (e.g. capping broadcast capacity of the dormant capacity at 60%+/−5% of total system capacity), which may be set forth as Target Broadcast Usage=MIN(Max Broadcast Usage, Max Dormant Capacity)

Unicast Service Traffic can then use the remaining dormant capacity

Target Unicast Usage=Max Dormant Capacity−target broadcast usage

Therefore, if unicast is the only delivery mode in use by the service provider 90, then:

Target Unicast Usage=Max Dormant Capacity

The DCCP system 1008 correlates past service usage to achieved end device throughput in a ratio, i.e. throughput to usage ratio=throughput achieved for an intermediate device/service usage or simply throughput to usage ratio.

The throughput to usage ratio is maintained separately for each intermediate device 16, and is an efficiency metric that reflects the radio conditions of the intermediate device 16 and, in a wireless network, the modulation and coding scheme level (MCS) that the intermediate device 16 is able to use. That is, if the intermediate device's signal-noise ratio (SNR) is high, the system is able to achieve a higher throughput with a given level of resource usage).

The DCCP system 1008 then uses the throughput to usage ratio, and available dormant capacity (Max Dormant Capacity), to set throughput targets ("target throughput") for all the intermediate devices for the next delivery cycle. The throughput targets can be per-device target throughputs for unicast (point-point) delivery, or an average target throughput for broadcast delivery. For example, target throughput=throughput/usage*target unicast usage.

The above calculation has a target unicast usage to achieve the target throughput, based on the known correlation between Throughput and service usage. The service provider 90 then uses target throughput settings, derived from DCCP system 1008, to adjust service usage throughput dynamically to utilize available dormant capacity, maintaining total usage in the cell within an upper bound of the total usage threshold. The idea is to use as much of the dormant capacity as possible, without going over the total usage threshold and creating any contention with regular network users. The process continues, through each reporting/delivery cycle. At the start of each delivery cycle, target throughputs are used to regulate data flow to the intermediate devices. At the end of each delivery cycle, the resource usage report for the period enables DCCP system 1008 to determine actual service usage for the cycle, and re-estimate the throughput to usage ratio per intermediate device. As described earlier, Max Dormant Capacity (and hence, target unicast usage) may also be adjusted period-to-period, based on adjustments made to regular usage.

A sudden spike in regular usage results in total usage spiking up (potentially exceeding total usage threshold). This can result in a higher service usage estimate than target unicast usage, and a lower throughput to usage ratio estimate for this cycle. In other words, the DCCP system 1008 sees more resources having been consumed to achieve the target throughput than earlier estimated (i.e. target unicast usage). At the same time, if regular usage is adjusted upwards, target unicast usage may also be reduced. Consequently, a lower target throughput setting is determined for the intermediate device than for the current delivery cycle. In this fashion, DCCP system 1008 self-corrects to bring down total usage to within threshold, moving forward. The converse happens if there is a sudden drop in regular usage, the throughput to usage ratio is increased, and a higher service throughput is targeted to fill the void.

The service usage determined for a cycle can be higher or lower than the target usage level (target unicast usage) because either: (a) regular usage spiked up or down, resulting in the calculated service usage going up or down; or (b) the prior throughput to usage ratio estimate was not accurate, and service usage was higher or lower than the dormant capacity target. In either case, DCCP system 1008 self-adjusts target throughput to correct the situation. This elasticity, or breathing mechanism, helps maintain total usage within bounds, while using as much of the dormant capacity as is desired.

The logic described above can be applied to a multi-cell (multi-carrier sector) scenario in a wireless network. If a sector has multiple carriers (service providers), each carrier is treated as a cell. A service provider 90 can turn on carrier aggregation in a multi-carrier sector, e.g. in an LTE or 5G network. The DCCP system 1008's multi-carrier handling factors in two dynamics: The intermediate device can move between carriers (cells) within the sector. This can manifest itself as a handover, if the intermediate device is active and connected to the communication network. Here, the LTE network becomes immediately aware of the cell change and flags this to the service provider 90. The intermediate device can execute a cell reselection procedure and change cells, in the case where the intermediate device is not actively connected to the wireless network. In this case, the network does not immediately become aware of the cell change. Further, carrier aggregation can occur, i.e. the intermediate device can be simultaneously connected to, send through and receive from, more than one carrier (cell). In LTE, for example, this can happen dynamically—the Network can add cells to/remove cells from an intermediate device at any time. The decisions are typically made by the wireless network's scheduler The multi-cell nature of this scenario leads to the premise that the intermediate device has potential access to the full bandwidth of the sector, i.e. to all carriers in the sector. Two approaches are the possible sector averaging approach and multi-cell attachment aware approach.

In the sector averaging approach, the DCCP system 1008 does not depend on knowing precisely to which cells the intermediate device is connected. It assumes that each intermediate device receiving delivery has access to the overall bandwidth of the sector, and uses sector-averaged values of the key resource usage parameters, i.e. target unicast usage, total usage, service usage and regular usage.

The DCCP system 1008 receives per-cell usage reports from the Network. The network also needs to inform DCCP system 1008 as to which cells (carriers) are configured for the sector, and the primary cell that an intermediate device 16 is connected.

DCCP system 1008 uses various parameters in its calculations and include but are not limited to total usage=average of total usage values for all carriers (cells) in the sector, regular usage=average of regular usage values for all carriers (cells) in the sector, service usage=(average of service usage values for all carriers (cells) in the sector)/number of intermediate devices simultaneously receiving delivery in the sector (the assumption here is that resource usage was shared equally amongst all the intermediate devices that received delivery). Another parameter is target unicast usage=average of target unicast usage values for all carriers (cells) in the sector. Yet another parameter may be throughput achieved=achieved throughput (measured by the system) by the intermediate device in a delivery cycle The numbers are used in the same calculations described generically in earlier sections—to derive throughput to usage ratios and target throughputs for intermediate devices.

The Multi-Cell Attachment Aware Approach factors in precise cell attachment awareness, i.e. DCCP system 1008 is aware of which cells (carriers) the intermediate device 16 is attached to at any given point in time. The assumption here is that the communication network 14 informs DCCP system

1008 when cells are added to and removed from the intermediate device's connection to the communication network 14.

In the Multi-Cell Attachment Aware Approach, the DCCP system 1008 determines per-device resource usage numbers based on measurements from the actual cells that the intermediate device has been connected. The DCCP system 1008 uses one of more of the following parameters in its calculations total usage=average of total usage values across the carriers (cells) the intermediate device has been connected to, regular usage=average of regular usage across the carriers (cells) the intermediate device has been connected to, service usage=average of service usage values across the carriers (cells) in the sector that the intermediate device is connected to, target unicast usage=average of target unicast usage values for all carriers (cells) in the sector and throughput achieved=achieved throughput (measured by the system) by the intermediate device in a delivery cycle.

The numbers are used in the same calculations described generically in earlier sections—to derive throughput to usage ratios and target throughputs for intermediate devices.

For purposes of adjusting targeted throughput, the intermediate device 16 is assumed to have access to the full dormant capacity in the sector, i.e. target unicast usage averaged across all cells in the sector.

Target throughput for an intermediate device for its next delivery period=target unicast usage*throughput/PRB The DCCP system 1008 also manages the number of active threads in the system. Each enabled thread can be considered to be a content delivery task, and does round-robin delivery to the intermediate devices, delivering to one intermediate device at a time—a "simulated broadcast" scheme. The round-robin, threaded scheme is another level of protection, aimed at preventing traffic spikes and regular traffic being affected. The number of parallel threads enabled per sector will depend on the regular usage in the sector. An example of a thread allocation scheme is: if regular usage for the sector<a Lower threshold, light up (N−1) Threads, where N=number of carriers in the sector. If regular usage for the sector is between the Lower threshold and an Upper threshold, light up one Thread. If regular usage for the sector>the Upper threshold, then light up 0 Threads (i.e. the system is paused)

The DCCP system 1008 therefore provides an "outer layer" of control in the outer loop policy control module 1016, modulating the use of capacity based on regular usage in the Network. This Thread management adds a layer of multi-carrier elasticity to the "breathing" provided by the base component of the algorithm. The threshold values are configurable and dynamically adjustable based on traffic load.

With broadcast delivery, the Service is able to serve multiple intermediate devices with the same content, using the same set of radio resources simultaneously. Hence, service usage leveraged by broadcast is exploited by multiple intermediate devices.

Broadcast functionality in wireless systems can also leverage simultaneous transmission of identical broadcast streams from multiple time-synchronized cells using the same radio channel. The synchronized multi-cell transmissions are received and combined by a device to achieve a higher signal-noise ratio (SNR), especially for cell edge devices that can hear transmissions from multiple cells. This feature extends broadcast into a multi-cell transmission paradigm, enabling a larger number of devices to receive a broadcast with good quality. Such a set of cells synchronized for broadcast constitutes the service area.

When estimating dormant capacity availability for broadcast, the DCCP system 1008 considers all cells in a service area. How well an intermediate device is served by a broadcast session depends on: (a) the radio conditions the intermediate device is experiencing; and (b) the available capacity of the cells the intermediate device can access.

A related innovation relates to the service provider 90, while using the broadcast service of the communication network, the traffic load may be divided up into multiple broadcast sessions. In this example, a broadcast period consists of multiple broadcast sessions, each representing a portion of the content that the service provider 90 needs to download and pre-position in the participating intermediate devices 16 in the service area. The service provider 90 establishes the broadcast sessions in the communication network 14, using available dormant capacity. This is done to make the process more granular, i.e. if the communication network is unable to support the total throughput requested, it will decline some sessions. However, not all sessions are declined.

At the start of a broadcast period, DCCP system 1008 determines available dormant capacity in the cells that comprise the service area, and establishes the target throughput for the broadcast period. This target throughput is split across the broadcast sessions established by the service provider 90 through the communication network 14. In an ideal situation, each participating intermediate device 16 should receive the full target throughput. Realistically, this may not happen, because: (a) the intermediate device 16 may not successfully receive all broadcast sessions; and (b) the intermediate device 16 may not receive the full throughput of a session it has received.

One issue is the communication network 14 may decline one or more of the broadcast sessions the service provider 90 has requested to be established. This is part of admission control functionality typically supported by wireless networks. For example, if the service provider 90 has requested the establishment of 20 broadcast sessions at 1 Mbps each, the communication network 14 may decide to admit just 12 of the sessions. This can vary across the cells in the service area. For example, one cell may have the capacity to admit all 20 sessions, whereas another cell in the service area may only have the capacity to admit 15 sessions.

The disparity in the amount of sessions may happen because the regular user traffic of the communication network requires enough capacity from the system, to allow for only 12 of the broadcast sessions to be carried out while preserving sufficient capacity for the rest of the regular user traffic. Therefore, some sessions may be admitted only by a subset of the cells in the service area; and hence may not be received by all intermediate devices 16 in the service area. Hence, a given intermediate device that is part of the broadcast period may receive only a subset of the sessions delivered. This occurs when one or more cells allows the establishment of a different number of sessions from the 20 requested, due to the contention with regular user traffic as described above. In this case, cells may have only 12, 15, or 18 or any other subset of 20 sessions admitted.

Similarly, the modulation and coding scheme (MCS) rate chosen for the broadcast in a given service area may effectively be deciphered by only a subset of the devices in a given cellular area. This may be as a result of the SINK of the individual devices in any given cell within the service area, providing for a device to effectively decode a certain MCS rate, or otherwise not be able to decode it due to inferior RF conditions. As such, the throughput achieved by the broadcast session across a cell, may be as high or lower, than the raise sent by the broadcast session. That is, if only 80% of the users are able to receive the 1 Mbps throughput in a session, the average throughput received by an intermediate device in this cell or broadcast session (as the average throughput across all participating intermediate devices in such cell or service area) will be 800 Kbps.

Average throughput received by the intermediate device 16 across a cell or service area then becomes an important metric, and becomes an important factor in understanding efficiency or efficiency metric of a broadcast—as the % of the throughput sent by a session vs the throughput received by the group of devices. Further, it can then be learned how this efficiency of a broadcast session changes, depending on the MCS level chosen for the broadcast and the robustness of the SINRs of the participating devices. Separately, it can be learned how much the efficiency is dependent on the level of dormant capacity loading attempted vs the level of regular user traffic available across the service area.

Another useful feedback metric is coverage level, defined as the percentage of devices in the broadcast that experienced delivery failure rates of less than a defined threshold value.

At the start of a broadcast period, the DCCP system 1008 determines the Broadcast target throughput for the period. This can be done in different of ways including using a reasonable spectral efficiency target or the radio conditions at the intermediate device 16.

For the reasonable spectral efficiency target 1 bit/sec/Hz is often used as a thumb rule for wireless broadcast systems. The target is applied to target broadcast usage to determine Broadcast target throughput. In other words, multiply the total spectral bandwidth in the available radio resource blocks by the chosen spectral efficiency to get the target throughput. This can be done cell by cell in the service area, based on the available dormant capacity in each cell. A target throughput is thus derived per-cell. An aggregated target throughput value, across all the cells in the service area, then needs to be derived from the per-cell values. This is because the service provider 90 ultimately has to submit one target throughput value, per session, to the wireless network. The aggregation in the aggregator 1014 can be done in multiple ways, including but not limited to choosing the lowest number obtained across all the cells (least common denominator approach)—if coverage maximization is the goal; choosing the highest number obtained across all the cells (the Network can always scale the service back, cell-by-cell, if it cannot meet that requirement); or, determining an "adjusted mean" based on the spread of the individual per-cell throughput values.

The adjusted mean approach takes into account the throughput actually allocated to the service provider 90 by the communication network will lie somewhere between the requested target throughput value and the lowest throughput supportable across the cells in the service area. If the spread of the per-cell throughput values is high, the service could end up receiving a significantly lower throughput than the requested value. For example: if the target throughput values are spread between 10 Mbits/sec and 30 Mbits/sec, and the service provider 90 requests a mid-value of 20 Mbits/sec, the service provider 90 will realistically get a throughput somewhere between 10 and 20 Mbits/sec. This is because the cells with the higher available capacity levels (i.e. capable of providing greater than 20 Mbits/sec) will still only provide 20 Mbits/sec. However, the "less capable" cells will provide throughputs ranging from 10 to 20 Mbits/sec, depending on their available capacity levels.

If, however, the spread is narrow (e.g. between 15 and 20 Mbits/sec), the service provider 90 will not get an allocation far removed from its requested rate. Therefore, taking this spread into account is helpful. The idea here is to choose a net throughput target higher than the average; the deviation from the mean being determined by the spread (standard deviation); the higher the standard deviation, the higher the selected value is above the mean. For example, choosing a value like (Mean+1 Standard Deviation) would make sense.

The target spectral efficiency level can subsequently be adjusted (for future broadcast periods), taking into account achieved throughput and Coverage Level feedback. For the next broadcast period, for the same service area, target spectral efficiency can be adjusted up or down based on the feedback collected.

A more deterministic approach uses measurements of the radio conditions of the intermediate device, to more accurately determine a deliverable throughput target. For each participating intermediate device, the radio channel quality (measured by signal strength, signal/noise-interference ratio (SINK), channel quality indicators, and other similar metrics) is used to determine a target modulation and coding scheme (MCS) level for the intermediate device.

The mapped MCS level reflects the highest modulation order that the intermediate device, in its current radio conditions, can reliably demodulate; as well as the level of channel coding (forward error correction) that needs to be applied to correct errors. The MCS level reflects the applicable spectral efficiency target, and is converted to target throughput (for the intermediate device), based on the number of available radio resource blocks. Once this is done, the individual (per-device) target throughputs can be aggregated across all participating intermediate devices 16 in the service area. As explained for the earlier method, the aggregation may involve choosing the mean target throughput value across all the intermediate devices, choosing a least common denominator choice, i.e. the lowest of the per-intermediate device values calculated across all the intermediate devices, choosing a highest common denominator value, i.e. the highest of the per-intermediate device values calculated across all the intermediate devices, choosing an "adjusted mean" value, factoring in the spread across all per-intermediate device target throughput values.

Once the overall target throughput for a broadcast period is determined (Broadcast target throughput), this is divided into multiple parallel broadcast sessions within the period.

Target throughput per Session=Broadcast target throughput/Throughput per Session For example, if the overall throughput target is 20 Mbits/sec, and it is desired to run broadcast sessions with 1 Mbit/sec each, 20 identical broadcast sessions are started up.

At the end of a broadcast period, DCCP system 1008 determines achieved device throughputs and Coverage Level. DCCP system 1008 also determines the Resource Usage—per-cell, and average across the cells in the service area, for the broadcast period. Available dormant capacity is also updated at this point.

For parallel unicast sessions, the DCCP system 1008 continues to manage dormant capacity. Unicast sessions are handled as described earlier, but with the target unicast usage value being used for Max Dormant Capacity, at least while broadcast sessions are simultaneously occurring.

Adjustments Based on Regular Network Traffic Load

Regular metrics from the communication network 14 inform the DCCP system 1008 as to whether the regular traffic load in the network has gone significantly up or down. If network load goes up significantly, DCCP system 1008 can shut down a number of broadcast sessions based on the estimated loading increase. Conversely, new broadcast sessions can be started up if network load is seen to have reduced significantly.

Radio Measurements may be leveraged to fine-tune operation of the system. In addition to collecting and using radio resource usage metrics to manage dormant capacity (as explained so far), DCCP system 1008 can also leverage network quality measurements. For example, signal strength and signal-noise ratio measurements can be used. In some wireless systems, it is possible to obtain signal strength and signal-noise ratio metrics specific to unicast and broadcast, i.e. determine how well the intermediate device is able to receive unicast signals as well as broadcast signals combined from multiple cells. Additionally, metrics such as latency and jitter can factor in as well.

Measurements can be collected in at least two ways. The first is by having the participating intermediate device 16 collect the radio metrics (e.g. from the modem processing unit in the intermediate device) and conveying them (over-the-top) to the service provider functionality located at the other end of the communication network 14. The intermediate device 16, in many ways, provides the best eyes-and-ears, since it is able to quantify the precise quality of experience it is receiving.

By deploying a software agents 1012A-1012C in the radio access network, e.g. at the cell level—for example, in an eNodeB in a cellular network. The software agent 1012 here provides a variety of network-side measurements, including radio resource usage information, directly to the service provider 90. Such information may include the regular usage being consumed so that the dormant capacity may be ascertained therefrom.

The DCCP system 1008 leverages the metrics to refine its dormant capacity management. For example, DCCP system 1008 then uses signal strength and or signal-noise ratio measurements to derive the appropriate modulation and coding scheme (MCS) level that the radio network might use to deliver content to a given intermediate device. Using this projected MCS level, DCCP system 1008 can better quantify a target throughput to be used for the intermediate device.

For broadcast, the same scheme can be used to determine the possible MCS level for each participating intermediate device 16 in the service area, derive the average MCS level usable for that population of intermediate devices 16, and then use the MCS level to set a more accurate target throughput for the broadcast period.

Additionally, metrics such as latency and jitter can be used to further refine the understanding at the DCCP system 1008's of the radio conditions of the intermediate devices, and further fine-tune dormant capacity management.

The DCCP system 1008 has an outer-loop parametric control system as illustrated in FIG. 10. Key operational parameters that drive DCCP system 1008 operation such as total usage threshold and Real Usage thresholds for Thread management are either configured (e.g. through a dashboard or programmatic API) or learned. A learning scheme uses historical data to determine day-of-week, time-of-day settings for the parameters. For example, total usage threshold values can be set for different times of the day, and different days of the week, by observing and storing past measurements of total usage, and assessing typical time-of-day, day-of-week total usage values.

In general, the DCCP system 1008 receives per-cell reports with the data described above from the communication network 14 and uses the metrics to estimate dormant capacity and service usage. The aggregator 1014 component then consolidates processing across sectors and service areas (for broadcast), and determines throughput to usage ratios and target throughputs (for intermediate devices or for broadcast periods). Feedback from the intermediate device 16 or 724 informs DCCP system 1008 on real throughput achieved by the intermediate devices 16 or 724. Finally, an outer-loop policy control module 1016 proactively configures the DCCP system 1008 operation with the parameters that drive its operation. The output from the DCCP system 1008 drives the operation of the service provider 90, informing the service as to when to start/pause/resume content delivery and what the target throughputs to intermediate devices are.

The DCCP system 1008 may be used for determining both broadcast and unicast for the mix of broadcast and unicast provided by the service provider 90. An optimum mix may be provided based upon the perimeters set forth above. The target throughput for a broadcast session using dormant capacity or unicast sessions are set forth.

The radio quality metric such as the signal strength or the signal to noise ratio are used to fine-tune the dormant capacity management and operational settings. Outer loop policy controls dynamically adjust the DCCP system operating parameters based upon feedback from the wireless network. The dynamic adjustment of thresholds such as the upper bound traffic usage threshold or the buffer may be changed. The DCCP for multiple unicast and broadcast cell configuration mode is provided. The system can accommodate a single-cell single carrier sector or sector with multiple carriers with or without carrier aggregation. The DCCP system 1008 for dual connectivity scenarios is enabled. Of course, the present system may be used with a variety of wireless technologies including LTE, 5G and satellite technologies.

Figure 11:
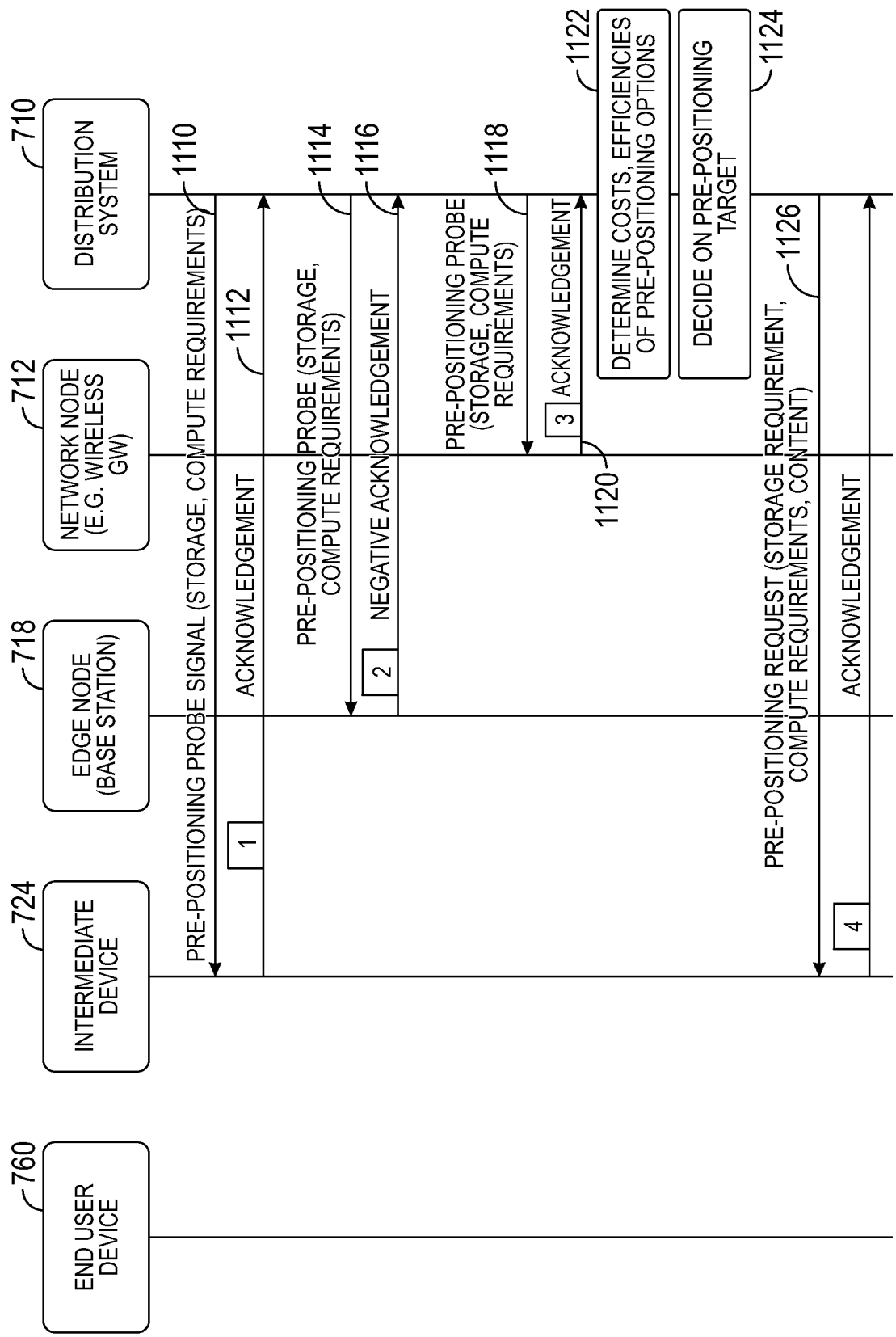
FIG. 11 is a system flow diagram for selecting a storage location for content.

Referring now to FIG. 11, a signal flow diagram between system components to accomplish the process of selecting a pre-positioning location and then pre-positioning content at that location is set forth. The word location in this context refers to a content storage device at a position within the communication system. The word location can thus be used interchangeably with content storage device. Although a particular set of nodes and components is illustrated, various devices in a system including those in FIG. 7 may be incorporated into the system as candidate storage device locations. In FIG. 11, devices with content storage are considered for storing or pre-positioning content therein. The content distribution system 710 identifies potentially multiple candidate locations (devices) at which to pre-position the content. The content distribution system 710 queries the first such candidate location—in this example, an intermediate storage device 724 located in the user's home. Any intermediate device 724 maybe used throughout this application interchangeably with the intermediate device 16.

In step 1110 a first pre-positioning probe signal is generated at the distribution system 24 and queries the first candidate location (intermediate device 724 in this example) to see whether the requisite storage and compute requirements (for storing and executing delivery of the content) are available. The probe signal is also used to obtain the cost data or performance data or both for leveraging the resource. The first candidate location (intermediate storage device 724) responds with an acknowledgement in step 1112, comprising data indicating that resources are available (availability data), and the costs that apply.

The content distribution system 710 then queries a second candidate location (in this case the edge node 718 of the wireless access network, e.g. a base station) with a another pre-positioning probe signal in step 1114 and the same set of query parameters. In this case, the second candidate location (edge node 718) responds with a negative acknowledgement signal at step 1116, indicating non-availability of storage resources (not enough storage capacity).

The content distribution system 710 then generates a third probe signal at seep 1118 with a third candidate location (e.g. a network node 712 such as a PDN gateway or user plane function in the 4G/5G network). The third candidate location returns an acknowledgement signal at step 112—with the requested cost and performance data.

The content distribution system 710 in step 1122 then does a cost and performance analysis of all three candidate pre-positioning locations. In each case, the content distribution system 710 tallies all applicable costs, including estimated future computing and networking costs at each location that would apply at the time of content delivery. The efficiency metric for each candidate location may also be communicated in the acknowledgement signal. The content distribution system 710 determines or obtains an overall delivery efficiency metric using the efficiency metric for each location, and selects one of the devices at the locations (in this example, the intermediate storage device 712) as the selected location in which to cache the content based at least in part on the overall delivery efficiency metric. The content distribution system 710 may also end up selecting multiple locations, in certain cases. Geographically diverse locations or locations located at different levels of the network may be chosen. A user demand pattern data may assist in determining the location or locations for content storage. Likewise, popularity may also be a factor in the location determination for the content storage.

In step 1126, the content distribution system 710 then issues a pre-positioning request to the selected content storage location, and stores the content at the selected content storage location. The pre-position request signal reserves content storage capacity and reserves compute capacity at the selected content storage location and communicates the content to the selected content storage location for storage therein. The selected content storage location returns an acknowledgement indicating caching success.

Figure 12:
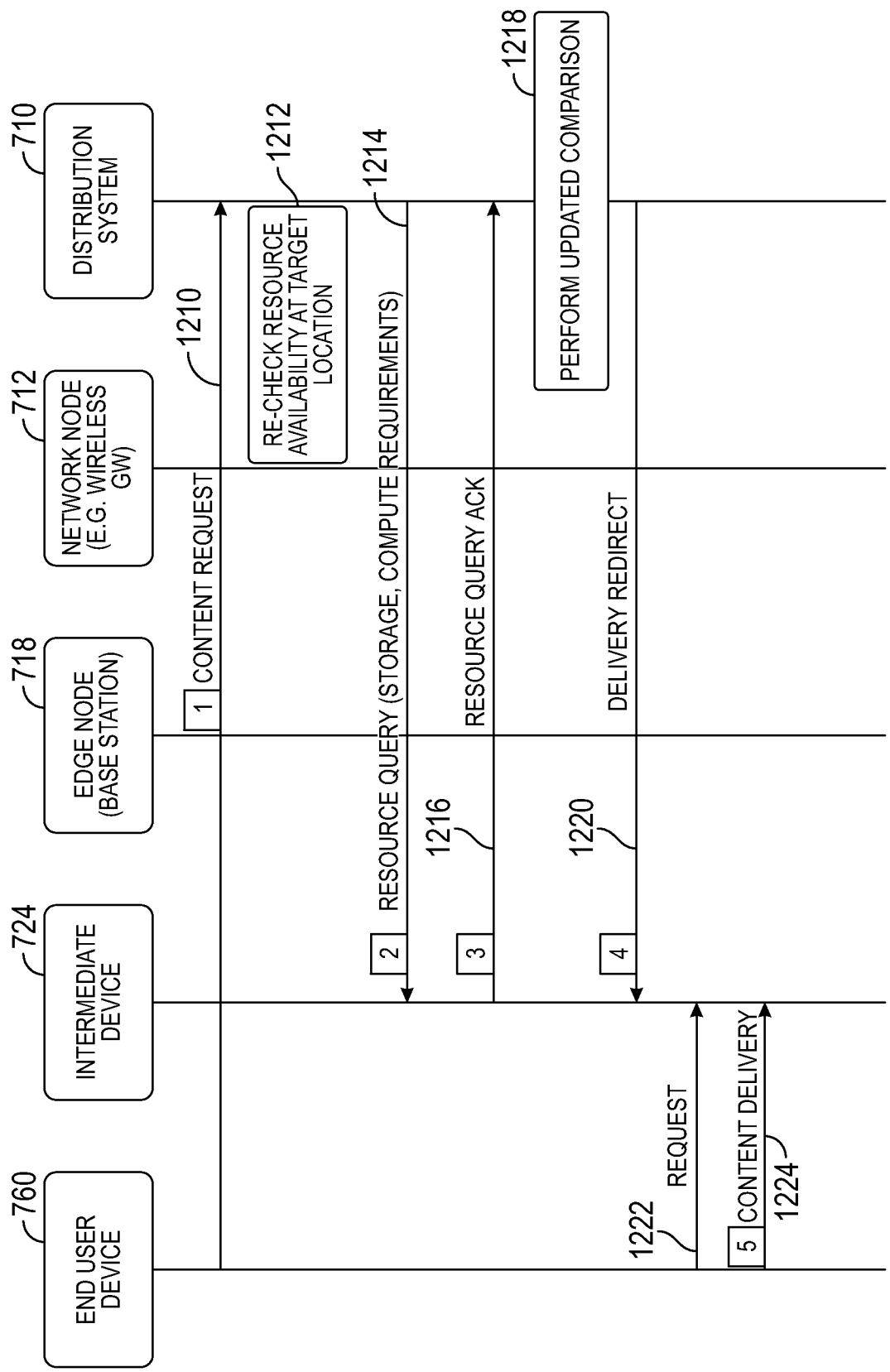
FIG. 12 is a signal flow diagram for delivering content from a request from an end user device from a selected content storage location.

Referring now to FIG. 12, a flowchart for a method of delivery of content to the user, from a selected pre-positioning location, at the time the user decides to consume the content is set forth. The end user device 760 requests the content by generating a content request signal that is communicated to the distribution system. The content request signal includes a content identifier identifying the specific content.

In step 1212, the content distribution system 710 re-checks resource availability at all locations where the requested content was previously pre-positioned. The content distribution system 710 obtains the latest view on availability of storage and compute resources. In step 1214, a resource query request is communicated to each location where the requested content was stored is used to obtain the view of the compute and storage resources.

In step 1216, each requested content location that has cached requested content returns a resource query acknowledge signal. The resource query acknowledge signal had data corresponding to the compute resource and the storage resource availability, which provides the current view of resource availability. The content distribution system 710 performs an updated comparison of all cached locations in step 1218, and determines a delivery location from the locations having the requested content.

The content distribution system 710 generates a delivery redirect signal 1220 to the user device 760 with location data for the selected delivery location. In the present example, the intermediate device 724 was selected as the selected delivery device. The content distribution system 710 may select the best network resources to deliver the content through. More than one resources may be selected. As mentioned above, different resources may be used for different portions of the content. In such a case, data for multiple resource locations may be provided in the delivery redirect signal.

In step 1222, the user device consumes content from the content storage device at the selected location by requesting the content from the location identifier and receiving the content delivery in step 1214. Step 1222 may take place without knowledge of the end user.

Figure 13:
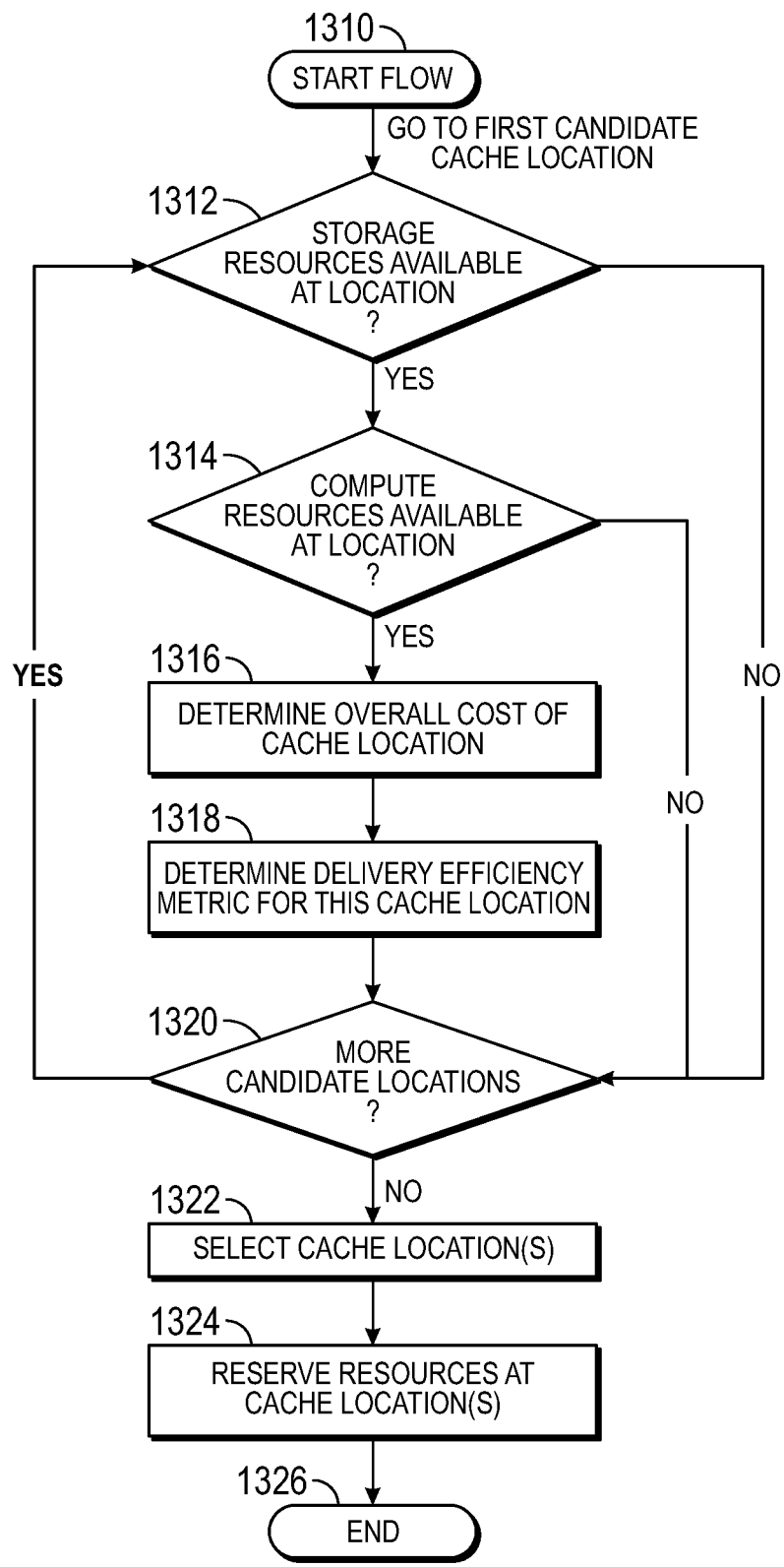
FIG. 13 is a flowchart of a method for determining a pre-position location during the selection process of the content distribution system.

Referring now to FIG. 13, the flowchart below illustrates the logic flow executed by the content distribution system 710, as part of the pre-positioning location selection process. The content distribution system 710 reviews data for each candidate location to see if sufficient compute and storage resources exist, and to assess the costs that the location would entail. After looping through all locations, the content distribution system 710 selects the best location and proceeds to cache the content at that location.

In step 1310, the method for determining the resources to be used to communicate content to an end user is started. In step 1312, a determination is made as to the storage resources available at a candidate location. The content distribution system is programmed to perform various steps. When resources are available at a location, the amount of resources available are communicated back in the acknowledgement signal. The location is queried using a pre-position probe signal described above in FIG. 11. When storage resources are available, step 1314 performs a determination as to whether compute resources are available at the location. A compute resource comprises the programming and computer processing that is used for storing the content at the candidate location. When compute resources are available in step 1314, step 1316 is executed in which the overall costs of the caching device location is determined. Likewise, in step 1318, a delivery efficiency metrics is determined from the cache location. After step 1318, if there are more candidate locations in step 1320, steps 1312-1318 are performed. Referring back to steps 1312 and 1314, when storage resources are not available at a candidate location or compute resources are not available at a location, step 1320 is executed. When more candidates are not available in step 1320, step 1322 selects a cache location based on the efficiency metrics and the availability of compute resources and storage resources. After step 1322, step 1324 reserves resources at the cache location for storing the content. Likewise, compute resources may also be reserved. The reservation of the compute resources and the storage resources may be performed in the pre-position request signal. The pre-position request signal may precede the content signal so that the reservation of the storage and compute requirements is performed. Thereafter, the content may be communicated. Once the content is communicated, an acknowledgement signal may be communicated back to the content delivery system to indicate proper storage of the content. The system ends the method in step 1326.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   determining a plurality of candidate locations for pre-positioning a content at a content distribution system within a wide-area network, said wide-area network comprising overall capacity comprising regular capacity and excess capacity;
   communicating probe signals to the plurality of candidate locations;
   generating acknowledgement signals at the plurality of candidate locations comprising storage availability data and compute data;
   selecting a real-time communication of the content using the wide-area network for consumption by a user or a pre-positioning communication of the content using the wide-area network for future communication of the content using a local-area network for consumption by a user at a future time, to form a selected communication based on the excess network capacity and at least one of a likelihood of consumption, the likelihood of consumption relative to a cost of storage, a cost of compute, and comparison of a cost of serving the content in real-time and a cost of serving the content using pre-positioning;
   selecting a selected content storage location for the content based on the storage availability data and compute data from the acknowledgment signals;
   communicating the content from the content distribution system to the selected content storage location using the excess capacity; and
   storing the content at the selected content storage location.

2. The method of claim 1 wherein the acknowledgment signals comprise a cost for storing the content at one of the plurality of candidate locations; and
   wherein selecting the selected content storage location comprises selecting the selected content storage location based on the cost.

3. The method of claim 1 wherein the acknowledgment signals comprise respective efficiency metrics for storing the content at one of the plurality of candidate locations; and
   wherein selecting the selected content storage location comprises selecting the selected content storage location based on the efficiency metrics.

4. The method of claim 1 wherein the acknowledgment signals comprise respective efficiency metrics for storing the content at one of the plurality of candidate locations; and
   wherein selecting the selected content storage location comprises selecting the selected content storage location based an overall efficiency metric on the efficiency metrics.

5. The method of claim 1 wherein selecting the selected content storage location comprises selecting the selected content storage location for the content based on the storage availability data and a popularity of the content.

6. The method of claim 1 wherein selecting the selected content storage location comprises selecting the selected content storage location for the content based on the storage availability data and a demand pattern for the content.

7. The method of claim 1 wherein selecting the selected content storage location comprises selecting the selected content storage location for the content based on the storage availability data and an overall delivery efficiency metric.

8. The method of claim 1 wherein selecting the selected content storage location comprises reserving content capacity in the selected content storage location with a pre-position request signal.

9. The method of claim 1 wherein selecting the selected content storage location comprises reserving content capacity and compute capacity in the selected content storage location with a pre-position request signal.

10. The method of claim 1 wherein communicating the content from the content distribution system to the selected content storage location comprises communicating the content to the selected content storage location using the excess network capacity.

11. The method of claim 10 further comprising determining the excess network capacity of a network based on based on a prior usage report and based on based a regular network traffic load.

12. The method of claim 1 wherein communicating the content from the content distribution system to the selected content storage location comprises communicating the content to the selected content storage location by broadcasting.

13. The method of claim 1 wherein communicating the content from the content distribution system to the selected content storage location comprises communicating the content to the selected content storage location by unicasting.

14. The method of claim 1 further comprising:
    generating a request for a first content at an end user device;
    communicating the request for the first content to the content distribution system;
    communicating a resource query signal from the content distribution system to a plurality of resource locations;
    communicating a resource acknowledgement signal from each resource location of the plurality of resource locations having the first content stored therein to form a plurality of resource acknowledgement signals, each of the plurality of resource acknowledgement signals comprise content availability data and a compute availability data;
    comparing the content availability data and the compute availability data of the plurality of resource locations;
    determining a delivery resource location from the plurality of resource locations based on comparing;
    generating a redirect signal comprising an identifier for the delivery resource location;
    communicating the redirect signal from the content distribution system to the end user device; and
    requesting, by the end user device, the content from the delivery resource location based on the identifier.

15. A system comprising:
    a plurality of candidate locations for pre-positioning a content;
    a content distribution system programmed to communicate probe signals to the plurality of candidate locations;
    the plurality of candidate locations programmed to generate acknowledgement signals comprising storage availability data and a first compute data;
    the content distribution system programmed to select a real-time communication of the content or a pre-positioning communication of the content to form a selected communication based on the excess network capacity and at least one of a likelihood of consumption, the likelihood of consumption relative to a cost of storage, a cost of compute and comparison of a cost of serving the content in real-time and a cost of serving the content using pre-positioning;

the content distribution system programmed to select a selected content storage location for the content based on the storage availability data and programmed to communicate the content from the content distribution system to the selected content storage location; and the selected content storage location storing the content.

16. The system of claim 15 wherein the acknowledgment signals comprises a cost for storing the content at the candidate locations; and wherein the content distribution system is programmed to select the selected content storage location for the content based on the storage availability data and the cost.

17. The system of claim 15 wherein the acknowledgment signals comprises an efficiency metric for storing the content at the candidate locations; and wherein the content distribution system is programmed to select the selected content storage location for the content based on the storage availability data and the efficiency metric.

18. The system of claim 15 wherein the acknowledgment signals comprises an efficiency metric for storing the content at the candidate locations; and wherein the content distribution system is programmed to determining an overall efficiency metric, select the selected content storage location for the content based on the storage availability data and the overall efficiency metric.

19. The system of claim 15 wherein the content distribution system is programmed to select the selected content storage location for the content based on the storage availability data, and a popularity of the content.

20. The system of claim 15 wherein the content distribution system is programmed to select the selected content storage location for the content based on the storage availability data, and a demand pattern for the content.

21. The system of claim 15 wherein the content distribution system is programmed to select the selected content storage location for the content based on the storage availability data, and an overall delivery efficiency metric.

22. The system of claim 15 wherein the content distribution system is programmed to select the selected content storage location by reserving content capacity in the selected content storage location with a pre-position request signal.

23. The system of claim 15 wherein the content distribution system is programmed to select the selected content storage location by reserving content capacity and compute capacity in the selected content storage location with a pre-position request signal.

24. The system of claim 15 wherein the content distribution system is programmed to communicate the content to the selected content storage location by communicating the content to the selected content storage location using the excess network capacity.

25. The system of claim 24 wherein an excess dormant capacity control protocol system is programmed to determine the excess network capacity based on based on a prior usage report and based on based a regular network traffic load.

26. The system of claim 15 wherein the content distribution system is programmed to communicate the content to the selected content storage location by broadcasting.

27. The system of claim 15 wherein the content distribution system is programmed to communicate the content to the selected content storage location by unicasting.

28. The system of claim 15 further comprising an end user device generating a request for a first content and communicating the request for the first content to the content distribution system;

the content distribution system communicating a resource query signal to a plurality of resource locations;

each resource location communicating a resource acknowledgement signal of the plurality of resource locations having the first content stored therein to form a plurality of resource acknowledgement signals, each of the plurality of resource acknowledgement signals comprise content availability data and a compute availability data;

the content distribution system programmed to compare the content availability data and the compute availability data from the plurality of resource locations;

determine a delivery resource location from the plurality of resource locations based on comparing;

generate a redirect signal comprising an identifier for the delivery resource location;

communicate the redirect signal to the end user device; and the end user device requesting the first content from the delivery resource location based on the identifier.

* * * * *